United States Patent
Park et al.

(10) Patent No.: US 7,638,983 B2
(45) Date of Patent: Dec. 29, 2009

(54) CONTROLLER OF DOUBLY-FED INDUCTION GENERATOR

(75) Inventors: Jung-Woo Park, Changwon-si (KR); Ki-Wook Lee, Kimhae-si (KR); Dong-Wook Kim, Busan-si (KR)

(73) Assignee: Korean Electro Technology Research Institute, Changwon-Si Kyungsangnam-Do (KR)

( * ) Notice: Subject to any disclaimer, the term of this patent is extended or adjusted under 35 U.S.C. 154(b) by 252 days.

(21) Appl. No.: 11/987,540

(22) Filed: Nov. 30, 2007

(65) Prior Publication Data

US 2008/0303489 A1    Dec. 11, 2008

(30) Foreign Application Priority Data

Jun. 8, 2007    (KR) .............. 10-2007-0056186

(51) Int. Cl.
*H02H 7/06* (2006.01)
*H02P 9/00* (2006.01)
*H02P 9/04* (2006.01)
*F03D 9/00* (2006.01)
*H02M 7/48* (2007.01)

(52) U.S. Cl. ............... 322/20; 290/44; 363/71
(58) Field of Classification Search ............. 322/20; 290/44; 363/71
See application file for complete search history.

(56) References Cited

U.S. PATENT DOCUMENTS

| | | | |
|---|---|---|---|
| 2,218,383 A * | 10/1940 | Herskind | 363/11 |
| 2,756,381 A * | 7/1956 | Rolf | 363/106 |
| RE24,456 E * | 4/1958 | Rolf | 363/106 |
| 2,976,528 A * | 3/1961 | Greunke et al. | 341/9 |
| 3,202,896 A * | 8/1965 | Lewns | 318/768 |
| 5,625,545 A | 4/1997 | Hammond | 363/71 |
| 5,798,631 A | 8/1998 | Spée et al. | 322/25 |
| 5,910,892 A * | 6/1999 | Lyons et al. | 363/98 |
| 5,933,339 A * | 8/1999 | Duba et al. | 363/71 |
| 6,005,788 A * | 12/1999 | Lipo et al. | 363/71 |
| 6,014,323 A | 1/2000 | Aiello et al. | 363/71 |
| 6,058,031 A * | 5/2000 | Lyons et al. | 363/67 |
| 6,101,109 A * | 8/2000 | Duba et al. | 363/71 |
| 6,118,932 A * | 9/2000 | Maurio et al. | 388/811 |
| 6,236,580 B1 | 5/2001 | Aiello et al. | 363/37 |
| 6,621,719 B2 * | 9/2003 | Steimer et al. | 363/43 |

(Continued)

FOREIGN PATENT DOCUMENTS

WO    WO 2004/098261 A2    11/2004

*Primary Examiner*—Nicholas Ponomarenko
*Assistant Examiner*—Pedro J Cuevas
(74) *Attorney, Agent, or Firm*—Robert E. Bushnell, Esq.

(57) ABSTRACT

Disclosed is a controller of a grid coupled type doubly-fed induction generator having a multi-level converter topology, which can control the doubly-fed induction generator having a high voltage specification and can perform a fault ride-through function, an anti-islanding function and a grid voltage synchronization function required for a dispersed power generation facility. The controller makes a H-bridge multi-level converter generate a three-phase voltage waveform resulted from the structure that single-phase converters each being composed of a 2-leg IGBT are stacked in a serial manner, and controls a rotor current so as to make the rotor coil of the doubly-fed induction generator in charge of a slip power only. The boost converter is composed of a 3-leg IGBT and a boost inductor generating a direct current voltage of its source required for the H-bridge multi-level converter.

14 Claims, 24 Drawing Sheets

U.S. PATENT DOCUMENTS

| | | | |
|---|---|---|---|
| 6,697,271 B2 * | 2/2004 | Corzine | 363/71 |
| 6,856,040 B2 | 2/2005 | Feddersen et al. | 290/44 |
| 6,954,366 B2 * | 10/2005 | Lai et al. | 363/71 |
| 7,050,311 B2 * | 5/2006 | Lai et al. | 363/37 |
| 7,253,537 B2 * | 8/2007 | Weng et al. | 290/44 |
| 7,535,738 B2 * | 5/2009 | Wei et al. | 363/71 |
| 7,579,702 B2 * | 8/2009 | Park et al. | 290/44 |
| 2003/0214824 A1 * | 11/2003 | Corzine | 363/71 |
| 2007/0182383 A1 * | 8/2007 | Park et al. | 322/89 |
| 2008/0049468 A1 * | 2/2008 | Wei et al. | 363/71 |

* cited by examiner

H-bridge Multi-Level type harmomic wave

2-Level type harmomic wave

US 7,638,983 B2

CONTROLLER OF DOUBLY-FED INDUCTION GENERATOR

CLAIM OF PRIORITY

This application makes reference to, incorporates the same herein, and claims all benefits accruing under 35 U.S.C. §119 from an application for CONTROLLER OF DOUBLE-FED INDUCTION GENERATOR earlier filed in the Korean Intellectual Property Office on 8 Jun. 2007 and there duly assigned Serial No. 10-2007-0056186.

BACKGROUND OF THE INVENTION

1. Field of the Invention

The present invention relates to a doubly-fed induction generator, and in particular, to a controller of a doubly-fed induction generator.

2. Description of the Related Art

A doubly-fed induction generator is a representative type of a generator which shares 50% of a wind power generation system market, and is also researched and developed for tidal current power generation, wave power generation, and hydropower generation. The market for the wind power generation system is rapidly growing enough to exceed 30% annually, and is expected to grow toward the large-scale system in the future. In addition, researches, leading to commercial use, on tidal current power generation, wave power generation, or hydropower generation for developing dispersed power generation facilities are reported.

Among dispersed power generation facilities, the wind power generation market has the largest share, and 50% of the wind power generation markets employ the doubly-fed induction generator. Accordingly, not only a new design approach on the doubly-fed induction generator itself is getting attention but an approach of controlling the doubly-fed induction generator is significantly getting attention.

In particular, the tendency of the doubly-fed induction generator is toward the large-scale type more than 3 MW while developments on the doubly-fed induction generator are toward lowering unit cost of generation [VkW] consumed to generate a unit power, which inevitably leads to a design for the generator voltage not less than 600V. Accordingly, the conventional approach of low voltage driving has a limit to control the doubly-fed induction generator.

FIG. 1 is a diagram illustrating a topology about a controller of a doubly-fed induction generator disclosed in U.S. Pat. No. 6,856,040. The controller uses a silicon-controlled rectifier (SCR) between a stator coil and a grid side coil of the generator to synchronize the grid voltage. However, this approach uses compulsive coupling in terms of hardware while voltage vectors are not synchronized with each other so that an inrush current may occur in the grid coupling step and it is difficult to expect a rapid response. This approach also uses a capacitor for controlling a power factor in the stator coil. The value of the capacitor is determined so as to have the power factor become one in a near-rated driving condition, so that the power factor may become lower than 0.9 when the wind speed condition is far from the near-rated specification. In addition, among currents flowing through the rotor coil, only the magnitude of the current applied to the rotor from the grid side can be controlled, so that a reverse current flowing toward a DC link side from the rotor coil can not be used as energy at a speed greater than the rated speed in terms of structure.

To summarize the disclosed technique to which the present invention is related, the approach disclosed in FIG. 1 (U.S. Pat. No. 6,856,040B2) is applied to more than 95% of the wind power generation systems to which the doubly-fed induction generation is applied, however, it has drawbacks that an energy generated from a rotor coil can not be regenerated toward a grid side and an active power and a power factor of the stator side of the doubly-fed induction generator can not be directly controlled. In addition, about 20% of the generated energy is regenerated toward means of the rotor coil, which is consumed as heat so that the energy availability is low, however it has a simple structure so that it requires a low cost.

FIG. 2 illustrates a topology used for a regeneration type inverter in a motor driving manner, which discloses a doubly-fed induction generator capable of bi-directionally controlling an energy flow by applying a 3-leg insulated-gate bipolar transistor (IGBT) to both ends of a DC link (U.S. Pat. No. 5,798,631A, WO 2004/098261 A2). It does not additionally use a switching element or a capacitor for controlling grid side voltage synchronization and power factor and ensures a complete control of one for the power factor regardless of a wind speed. However, it disadvantageously has a high voltage distortion factor and is not perfect in terms of grid voltage synchronization, and is required to have an improved technique which can ensure high quality of maintenance and safety of the power grid when the grid is electrically interrupted or shortly interrupted.

FIG. 2 illustrates a technique which improves technical drawbacks of FIG. 1, which can thus control a power factor and a power to be regenerated toward the stator side of the doubly-fed induction generator regardless of the magnitude of speed and load and can regenerate 20% of energy regenerated toward the rotor side of the doubly-fed induction generator in the grid side (U.S. Pat. No. 5,798,631A, WO 2004/098261 A2). However, this approach has a topology mainly used for controlling a generator having a low voltage specification because it is based on a 3-leg IGBT module, and has a structural drawback that it corresponds to a 2-level converter having only two kinds of line voltage potential of an output voltage so that a distortion factor is very high enough to exceed 10% in a low speed region far from a rated speed. Such a bad voltage distortion factor becomes worse when a high voltage doubly-fed induction generator having a high voltage specification is driven. In order to drive the high voltage generator, the voltage also increases, which inevitably leads to a higher DC_link voltage, and a variation width of the voltage (dv/dt) varies up to two times the DC_link voltage, which increases more than the case of low voltage. When the generator is controlled by a signal having a significant variation width, the generator may be broken due to breakdown, and a reflective signal may occur all the time when the generator is driven by a control signal from a converter, so that an overlapped result may return to the input side when a voltage distortion factor is high, which limits the spaced distance, usually not more than 20 [m], between the converter and the generator.

FIG. 3 illustrates an H-bridge multi-level topology developed for driving a motor (U.S. Pat. No. 5,625,545A, U.S. Pat. No. 6,014,323A, U.S. Pat. No. 6,236,580B1). Several single-phase converters each composed of 2-leg IGBT can be stacked in a serial manner to generate a voltage waveform having a multi-level potential so that the high voltage distortion factor of FIG. 2 can be significantly decreased. However, a direct current voltage used for each single-phase converter must be isolated from each other so that a multi-stage transformer is additionally required for an input end. It is not reported yet that the voltage is used for controlling a doubly-fed induction generator so as to be used in a dispersed power generation facility.

FIG. 3 illustrates an H-bridge multi-level converter, which can generate a multi-level voltage waveform and an output voltage to allow for a high voltage specification so that it can control a motor such as an induction motor (U.S. Pat. No. 5,625,545A, U.S. Pat. No. 6,014,323A, U.S. Pat. No. 6,236,580B1). It employs a method, which applies a coordinate transformation manner allowing a motor to rotate in the same frequency as the rotating frequency, transforms various signals into a d-q rotating coordinate system, and includes various control strategies to restore the frequency same to the rotating frequency. When such a method is employed for controlling the doubly-fed induction generator, 0 [Hz] is generated, which results from the difference between a voltage frequency induced to the stator coil and a grid frequency, so that grid coupling can not be made, which leads to degraded doubly-fed induction generator that can not generate a power source from a dispersed power generation facility. Accordingly, a control algorithm capable of controlling the doubly-fed induction generator must be developed, which is not reported in the H-bridge multi-level converter type. Furthermore, a control algorithm is not yet reported which is developed for having a fault ride-through function, an anti-islanding function and a grid voltage synchronization function which are specifically required when a grid-coupled generator needs to be controlled.

SUMMARY OF THE INVENTION

The present invention is directed to a controller of a grid-coupled type doubly-fed induction generator, which represents a new approach of controlling the doubly-fed induction generator having a multi-level converter topology to allow the doubly-fed induction generator having a high voltage specification to be controlled and to allow a fault ride-through function, an anti-islanding function and a grid voltage synchronization function which are required for a dispersed power generation facility to be performed.

The present invention is also directed to a controller of a grid coupled type doubly-fed induction generator, which uses 3-leg IGBT modules back-to-back, and can control the doubly-fed induction generator and improve conventional problems such as a very high voltage distortion factor, a large voltage variation width (dv/dt), and a short spaced distance between a generator and a controller due to reflective waves which usually occur when the doubly-fed induction generator having a low voltage specification is controlled.

One aspect of the present invention is to provide a controller for controlling a doubly-fed induction generator having a stator coil coupled to a three-phase grid coil through a switch and a rotor coil as a control coil, which comprises: a H-bridge multi-level converter having a multi-level topology that single-phase converters each composed of a 2-leg insulated-gate bipolar transistor (IGBT) are stacked in a serial manner, generating a three-phase voltage waveform, and controlling a rotor current so as to allow a rotor coil of the doubly-fed induction generator to be in charge of a slip power only; and a boost converter composed of a 3-leg IGBT and a boost inductor generating a direct current voltage of its source required for the H-bridge multi-level converter.

Preferably, the H-bridge multi-level converter performs a function of controlling a power factor of the stator coil, and a function of synchronizing a voltage vector generated from the stator coil with a grid voltage vector for supplying a dispersed power, and the boost converter performs a function of controlling a power factor of the stator coil, a fault ride-through function of controlling a reactive power to be supplied when the grid voltage is unstable, and a function of inputting a white noise for easily preventing an islanding.

In order to control the doubly-fed induction generator, a slip power (or a slip speed, slip torque) must be controlled in the rotor coil side, a rotating magnetic field rotating in a slip frequency must be made, bi-directional control is required for supplying or recover a current, and in particular a new control approach for driving a high voltage generator is required for controlling a large-scale doubly-fed induction generator greater than 3 MW.

The present invention is characterized in terms of hardware in that a basic concept about a H-bridge multi-level converter is employed to present a controller for controlling a large-scale doubly-fed induction generator, and in terms of software in that a control algorithm is developed for having a fault ride-through function, an anti-islanding function and a grid voltage synchronization function which are required for a grid coupled type dispersed power generation facility. Accordingly, products of the controller are developed more and more toward the large-scale type in order to reduce a unit cost of generation, and in particular the doubly-fed induction generator greater than 3 MW is put into the market as one having a high voltage specification greater than 600V of the rotor coil specification, so that it is expected that the present invention, when applied thereto, can control with a high quality a wind power generation system, a tidal current power generation system, a tidal power generation system, a wave power generation system which have a high voltage and large-scale specification and can enhance stability in a grid coupled environment.

The present invention has the following effects.

1) a high voltage and large-scale doubly-fed induction generator can be controlled which is applied to a dispersed power generation facility.

2) a multi-level topology is applied for controlling the doubly-fed induction generator, so that a distortion factor about an output voltage can be significantly decreased, the breakdown of the generator can be mitigated, a problem that a total harmonic distortion (THD) on a current exceeds a reference value under a rated speed can be overcome, and a mounting distance between a controller and a generator is not limited.

3) a reactive power can be supplied to rapidly recover a grid voltage under a short interruption condition, which can thus correspond with an EON Netz Standard that requires the reactive power to be supplied in accordance with a magnitude of voltage drop.

4) a d-axis current of white noise type can be input in an entire time band so as to be easily detected while a dispersed power generation facility is not subjected to islanding under an electric power interruption condition, so that the islanding problem can be overcome fast.

5) a conventional problem that a voltage vector was not synchronized under encoder location movement, grid voltage variation, and incorrect generator equivalent constant conditions can be overcome, and a H-bridge converter can be controlled so that a voltage generated in a stator of a doubly-fed induction generator can be synchronized with a grid voltage under any conditions.

6) the present invention can be applied for controlling a wind power generation system having a doubly-fed induction generator and exceeding 3 MW, a tidal current power generation system, a tidal power generation system, and a wave power generation system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAIL DESCRIPTION OF THE EMBODIMENTS

Figure 1:
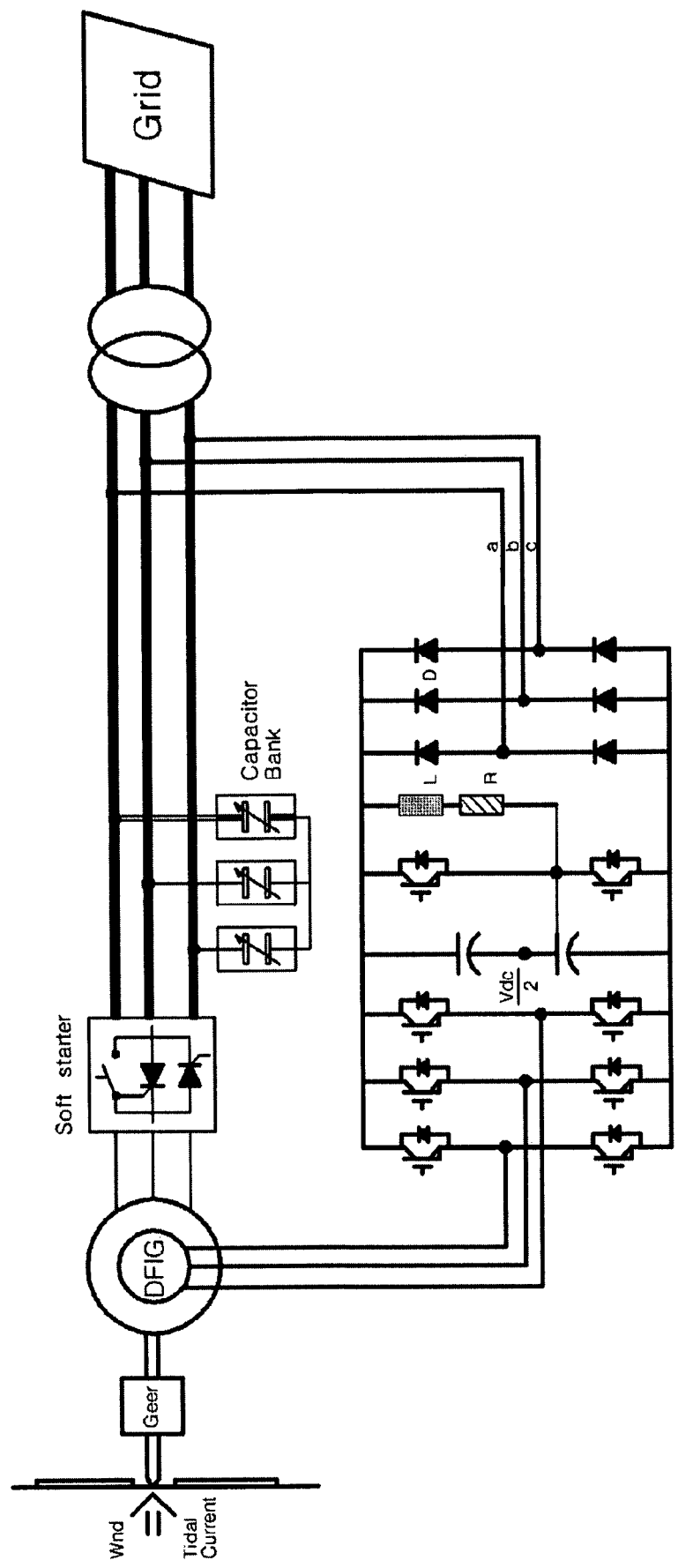
FIGS. 1 and 2 are diagrams illustrating a controller of a conventional doubly-fed induction generator.
Figure 2:
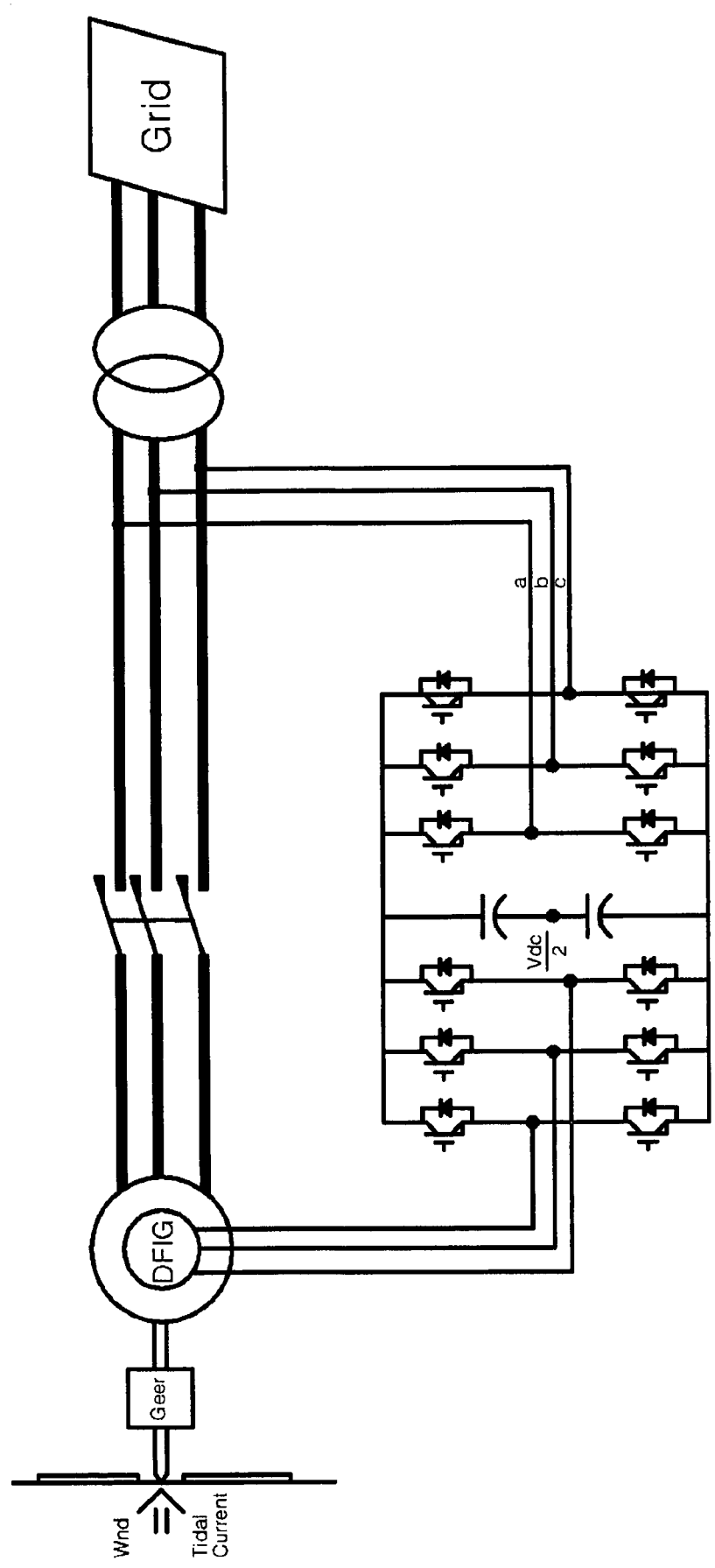
Figure 3:
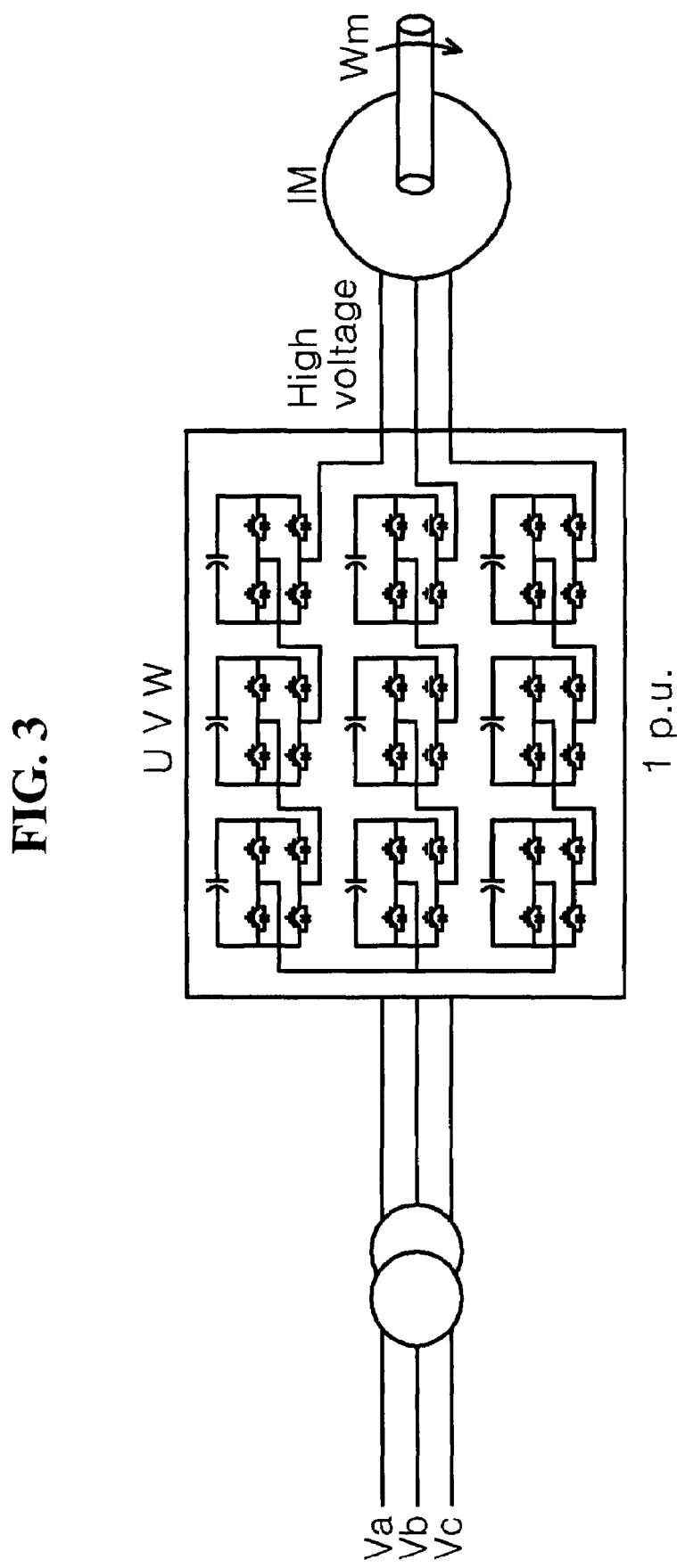
FIG. 3 is a diagram illustrating a controller of a conventional induction motor.

The present invention relates to a method of controlling a doubly-fed induction generator having a high voltage specification (or a doubly-fed induction motor), whereas the conventional 2-level inverters are designed back-to-back to control the doubly-fed induction generator (U.S. Pat. No. 5,798, 631A, WO 2004/098261 A2).

The approach of controlling the doubly-fed induction generator composed of 3-leg IGBTs back-to-back with a signal having a two-level voltage output has a structure capable of transceiving an energy from one direction and the opposite direction so that it can cope with both log voltage specification and high voltage specification. However, it drives the doubly-fed induction generator by generating a voltage waveform having a two-level shape, so that the voltage distortion factor is not good and a voltage variation width (dv/dt) varying in a unit period is inevitably large which often leads to a breakdown of the generator. Accordingly, when the generator has a high voltage specification, the generator must be disadvantageously designed so as to enhance an insulating strength in consideration of the above described problems.

According to the pending standard on the controller of the grid coupled type doubly-fed induction generator, a dispersed power generation facility must be isolated from the power grid within 0.16 second when the grid voltage falls below 50%, within 2 seconds when it falls between 50% to 80%, and also 2 seconds when its increases between 110% to 120%. When the dispersed power generation facility stops driving, it must have a pause of 5 minutes even when the power grid gets back to a normal state, and then can be coupled to the grid again.

Accordingly, when an abnormal condition occurs such that the grid voltage falls within a predetermined range or increases, since the dispersed power generation facility must be stopped regardless of its recovery and can not be operated again for 5 minutes after stopping, a voltage corresponding to the amount which the dispersed power generation facility is responsible for fluctuates in the grid even when a minute short interruption occurs, so that it can be seen that the degree of stability of the entire grid may be driven to be worse during a short interruption interval in the wind power generation site.

To cope with such a problem, in the Europe having the most advanced dispersed power technique, obligations ("Grid Code"/EON Netz GmbH standard, 2003) to actively support an reactive power so as to fast recover the grid voltage rather than stop the dispersed power generation facility are promoted on the short interruption that an electrical interruption occurs for 150 ms and then the voltage is recovered, which are consistent with requirements of the power company having power networks.

In the electrical interruption mode, a vacuum circuit breaker (VCB) having an anti-islanding function is installed for preventing the dispersed power generation facility from being isolated and driven, and it is sensed whether a frequency variation width (df/dt) varying per unit time exceeds a limit range, and the dispersed power generation facility is made to stop when it exceeds the limit range. However, when the dispersed power generation facility takes a balance with a load or is driven near the balance, the frequency variation width (df/dt) does not vary or vary very slowly, which thus may not be sensed within 14 cycles required by the related regulations. Accordingly, simply sensing the df/dt to avoid the islanding mode tacitly approves a nondetection zone (NDZ), so that a more improved method for reducing the driving risk in the electrical interruption to 0% is required.

In addition, when the doubly-fed induction generator needs to be controlled using a power controller having a multi-level converter structure, a high inrush current occurs when a voltage phase is not equal to a voltage magnitude at the point of time that the stator coil is coupled to the grid voltage coil, which may break the controller of the generator and may damage the customer coupled to the grid, so that a synchronization method for preventing the inrush current is necessarily required.

Accordingly, the present invention employs a method which applies to a H-bridge multi-level topology a characteristic resulting from the structure that 2-level converters are arranged back-to-back and a characteristic allowing a current to be bi-directionally transceived in the same manner and an active power and a reactive power of the doubly-fed induction generator to be controlled by means of slip control, so that 1) the slip power can be bi-directionally controlled in the H-bridge multi-level converter, 2) d and q currents can be controlled so as to make the rotor coil in charge of the slip power to control magnitudes of the active power and the reactive power generated through the stator coil of the doubly-fed induction generator, 3) the reactive power can be supplied in a short interruption mode to support recovery of the grid voltage, 4) a d-axis current as a white noise signal can be input so as to rapidly avoid the islanding in the mode in which the grid is electrically interrupted, and 5) a synchronization function can be performed such that an inrush current can be prevented from occurring when the stator coil is coupled to the grid.

In addition, 6) a voltage distortion factor problem which is an inherent problems of the H-bridge multi-level converter can be overcome, so that a breakdown of the generator can be reduced, and a problem that a T.H.D. with respect to current under a rated speed does not satisfy the regulation, that is, 5% or lower of the reference value, can be solved, 7) and a mounting distance between the H-bridge multi-level converter and the doubly-fed induction generator can be extended up to 1 km.

The doubly-fed induction generator is designed to have a low voltage specification not greater than 600V when its capacity is not greater than 2 MW, however, it is designed to have a voltage specification greater than 600V (usually 1,000V) when its capacity is greater than 3 MW, so that an approach of controlling the doubly-fed induction generator having a high voltage specification is required, which leads to the present invention providing a controller capable of controlling the doubly-fed induction generator and having a H-bridge multi-level converter capable of performing bi-directional control. The controller has a basic and new control algorithm coupled to a rotor coil as a control coil and capable of controlling a slip power so as to control magnitudes of an active power and a reactive power delivering through the stator coil of the doubly-fed induction generator and so as to have a cooperative function in accordance with a degree of electrical power interruption and a voltage drop for a suitable use of a grid coupled type. This will be described below in detail.

The H-bridge multi-level converter used in a motor driving manner has a structure serially coupled to the motor and is coupled to the stator coil so that is requires the same 1 p.u. as the capacity of the motor, whereas the H-bridge multi-level converter for controlling the doubly-fed induction generator of the present invention is coupled to the rotor coil and has a slip capacity only of about 0.3 p.u. of the generator capacity and the stator coil is directly coupled to the grid without a converting device therebetween. The approach of controlling the motor performs coordinate transformation by means of frequency corresponding to the rotating speed and supplies 100% of energy required by the motor, whereas the approach of controlling the doubly-fed induction generator performs the coordinate transformation using a phase angle calculated from an error frequency generated between the rotating frequency of the generator and the grid frequency, that is, a slip frequency, and is different from the approach of controlling the motor in that an active power of the rotor side to be regenerated more than 70% can be controlled using a means for controlling the slip power of about 30% without a power converting device. However, the topology and the PWM method which generate, inherent characteristics of the H-bridge multi-level converter, that is, multi-level voltage waveforms partially share the existing approach for controlling the motor.

As is well known in the H-bridge multi-level converter, it has a 2-leg IGBT composed of four IGBTs as a unit module so as to output +VDC, −VDC, 0 voltages in accordance with switching states when a low direct current voltage of its source is supplied, and determines the number of unit modules to be used per each phase R, S, T in accordance with the number of multi-levels calculated in advance so as to meet the target value of the voltage distortion factor, so that the IGBT configuration for the H-bridge multi-level converter becomes completed.

Figure 4:
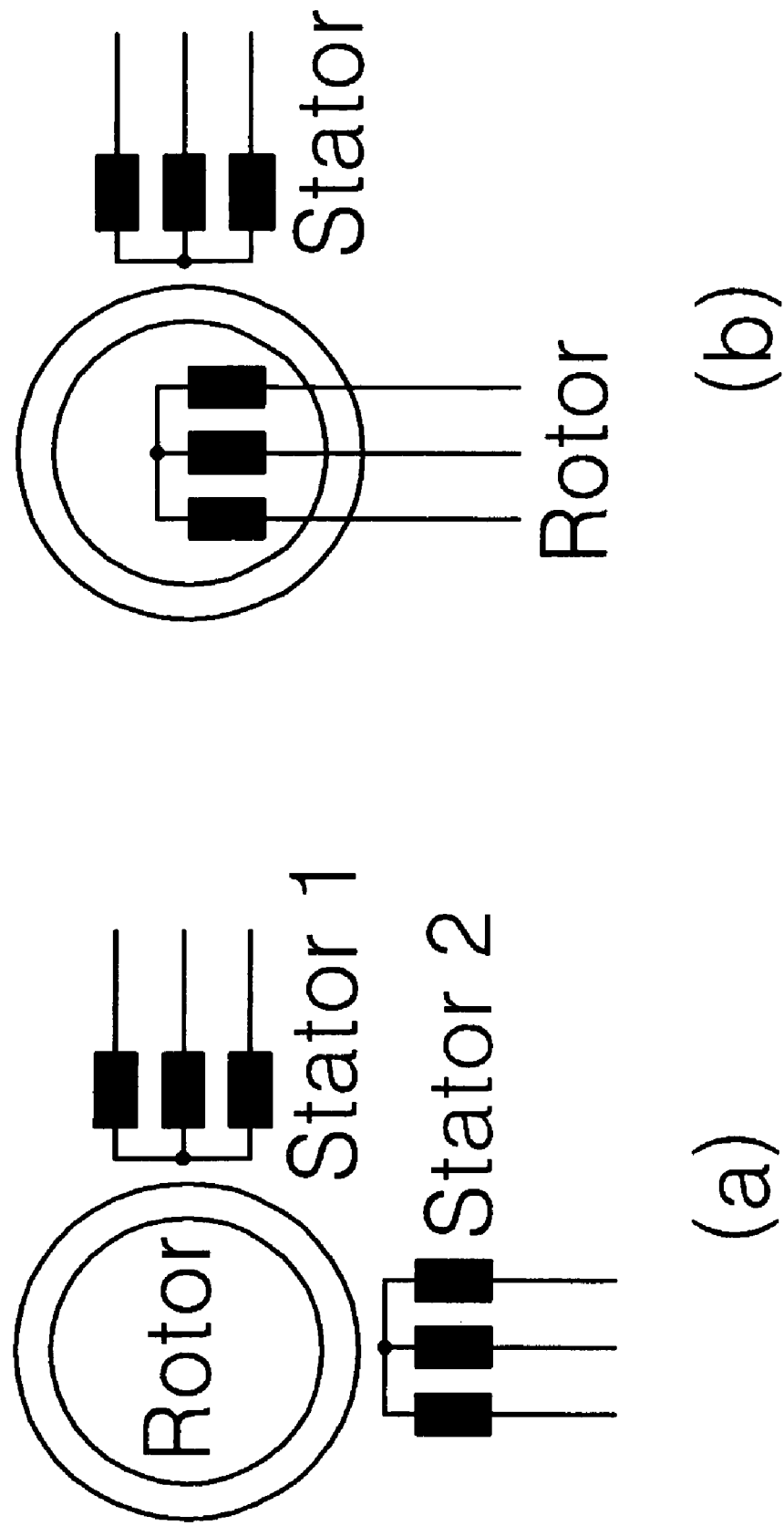
FIG. 4 is a diagram illustrating a kind of a doubly-fed induction generator having an additional rotor coil to which the present invention can be applied.

FIG. 4 illustrates a kind of a doubly-fed induction generator, which has one more control coil in the stator side and uses the rotor coil as a control coil.

Figure 5:
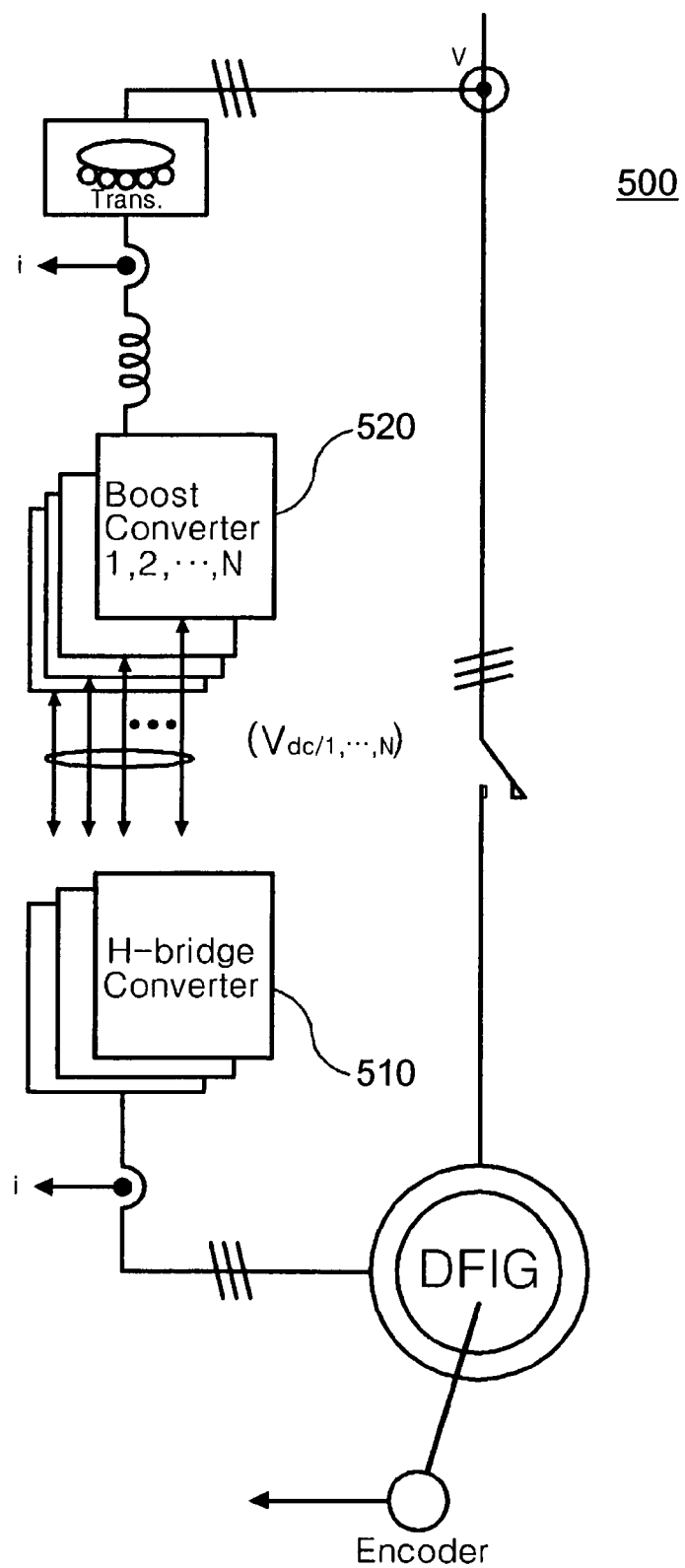
FIG. 5 is a diagram illustrating a controller of a grid coupled type high voltage doubly-fed induction generator in accordance with embodiments of the present invention.
Figure 6:
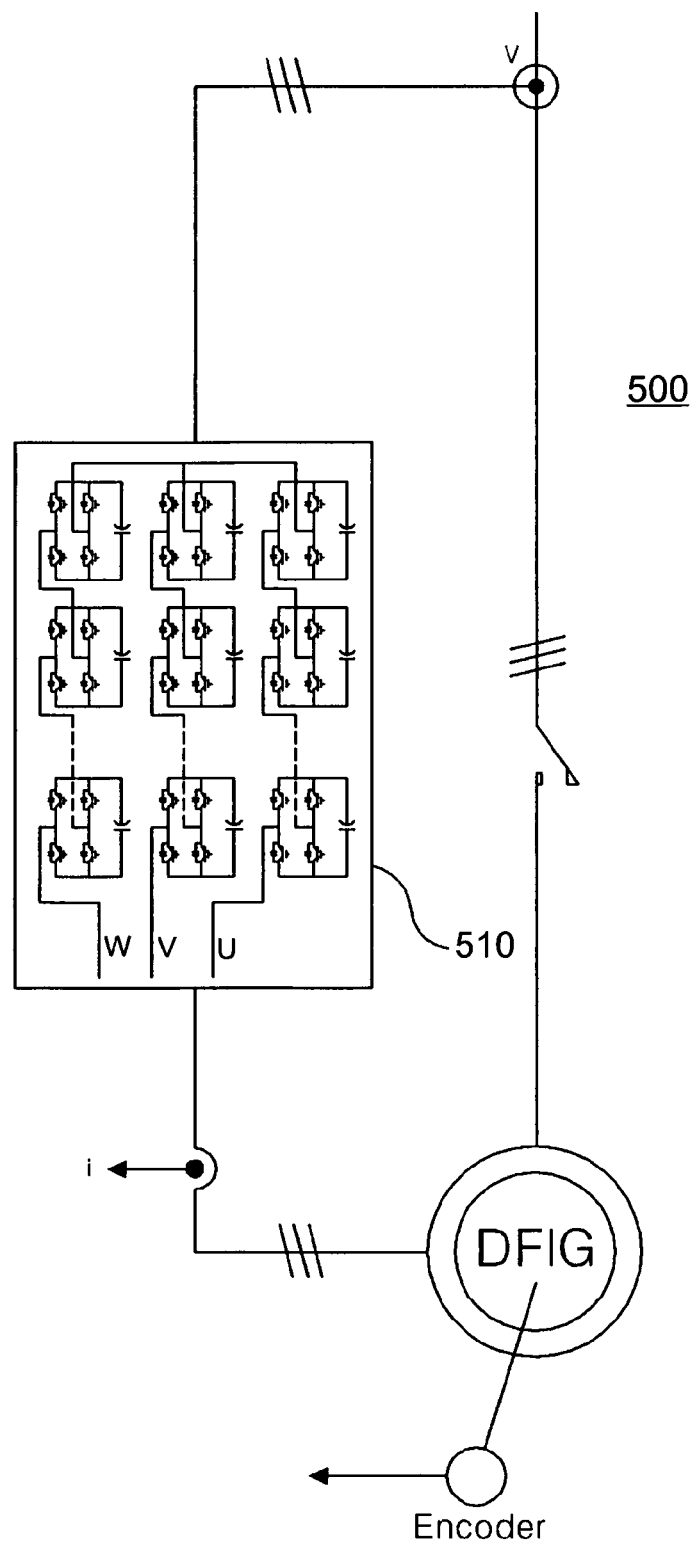
FIG. 6 is a diagram illustrating a grid coupled type high voltage doubly-fed induction generator coupled to an H-bridge multi-level converter only without displaying a boost converter shown in FIG. 5.

FIG. 5 is a diagram illustrating a controller of a grid coupled type high voltage doubly-fed induction generator, which uses an H-bridge multi-level converter to control a slip power of a DFIG.

The controller of the grid coupled type high voltage DFIG according to embodiments of the present invention controls the DFIG having its stator coil coupled with a three-phase system coil through a switch and having a rotor coil as a control coil. The controller of the DFIG according to embodiments of the present invention includes an H-bridge multi-level converter 510 and a boost converter 520, which is shown in FIG. 5 similar to a bi-directional AC-DC-AC conversion structure of a low voltage converter. The controller has the boost converter (bi-directional AC-DC) for supplying a direct current voltage from its source to the 2-leg IGBT in an input end, and has the H-bridge converter (bi-directional DC-AC) for supplying a multi-level signal to the rotor coil side.

The H-bridge multi-level converter 510 forms a multi-level topology resulting from that single-phase converters each composed of a 2-leg IGBT are stacked in a serial manner to generate a three-phase voltage waveform, and controls the rotor current to allow the rotor coil of the DFIG to be in charge of the slip power only. The H-bridge multi-level converter 510 performs a function of controlling the power factor of the stator coil and a function of synchronizing the voltage vector generated from the stator coil with the grid voltage vector for supplying a dispersed power.

The H-bridge multi-level converter 510 is characterized in that it can be coupled between the grid coil and the rotor coil of the DFIG for controlling the DFIG, bi-directionally control the slip power, supply a reactive power to the grid to rapidly recover the grid voltage under a condition that the grid voltage is shortly interrupted, generates a d-axis current as a white noise to have a significant frequency variation for preventing islanding of the DFIG under the condition that the grid voltage is shortly interrupted and have a synchronization function for coupling the stator coil with the grid.

To describe the IGBT configuration for the H-bridge multi-level converter 510 used as the controller of the DFIG, when the voltage specification for the stator coil of the DFIG has 6,600V, a range of voltage controlled by the rotor coil must be 0 to 1,980V in consideration of the slip rate of 30%. Accordingly, when a magnitude of a direct current voltage of the H-bridge converter is 660$V_{DC}$, the voltage specification for one phase can be satisfied when only three unit modules are serially coupled to each other. When the voltage specification of the rotor is 1000V, the voltage specification for one phase can be satisfied when two unit modules are serially coupled to each other after the magnitude of the direct current voltage is set to 311$V_{DC}$. The magnitude of the direct current voltage and the number of unit modules are determined in consideration of the voltage distortion factor specification and a power that can be supplied, however, there is no unified standard for the determination. Since the number of phases for controlling the generator is three, the configuration of the controller of the DFIG can be obtained as shown in FIG. 7 when the rest two phases are configured to have the same configuration as the one phase configuration.

Figure 7:
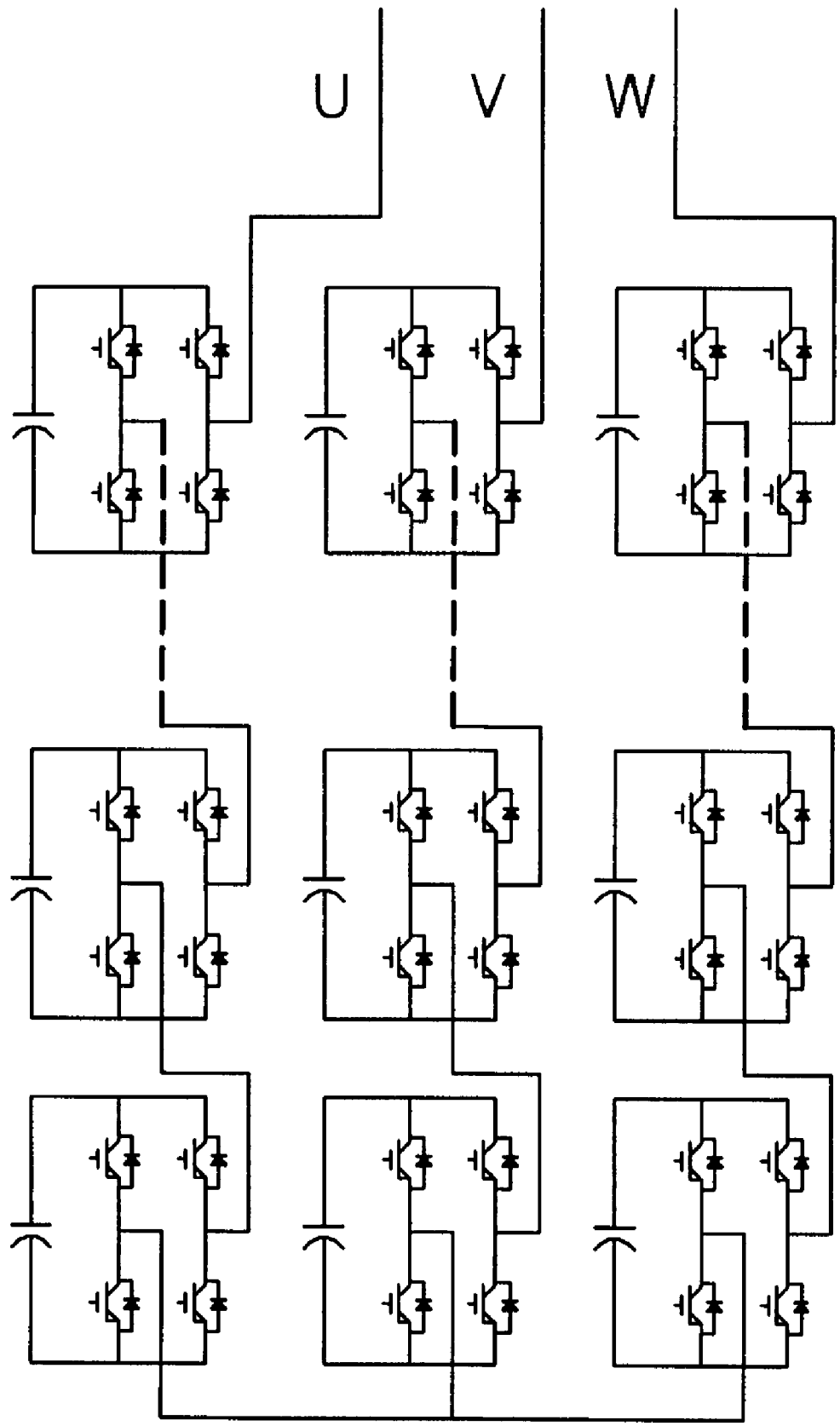
FIG. 7 is a circuit diagram illustrating that the number of H-bridges can be flexibly determined in the H-bridge multi-level converter shown in FIG. 5 in accordance with a voltage specification of the doubly-fed induction generator.

FIG. 7 is a circuit diagram illustrating the H-bridge multi-level converter shown in FIG. 5. The direct current voltage source can perform AC-DC conversion bi-directionally, and uses a boost converter shown in FIG. 8 for flexibly coping with the variation of the direct current voltage of the source. It should be noted that the direct current voltage power used in each of 2-leg IGBTs must be designed to be isolated from each other.

Figure 8:
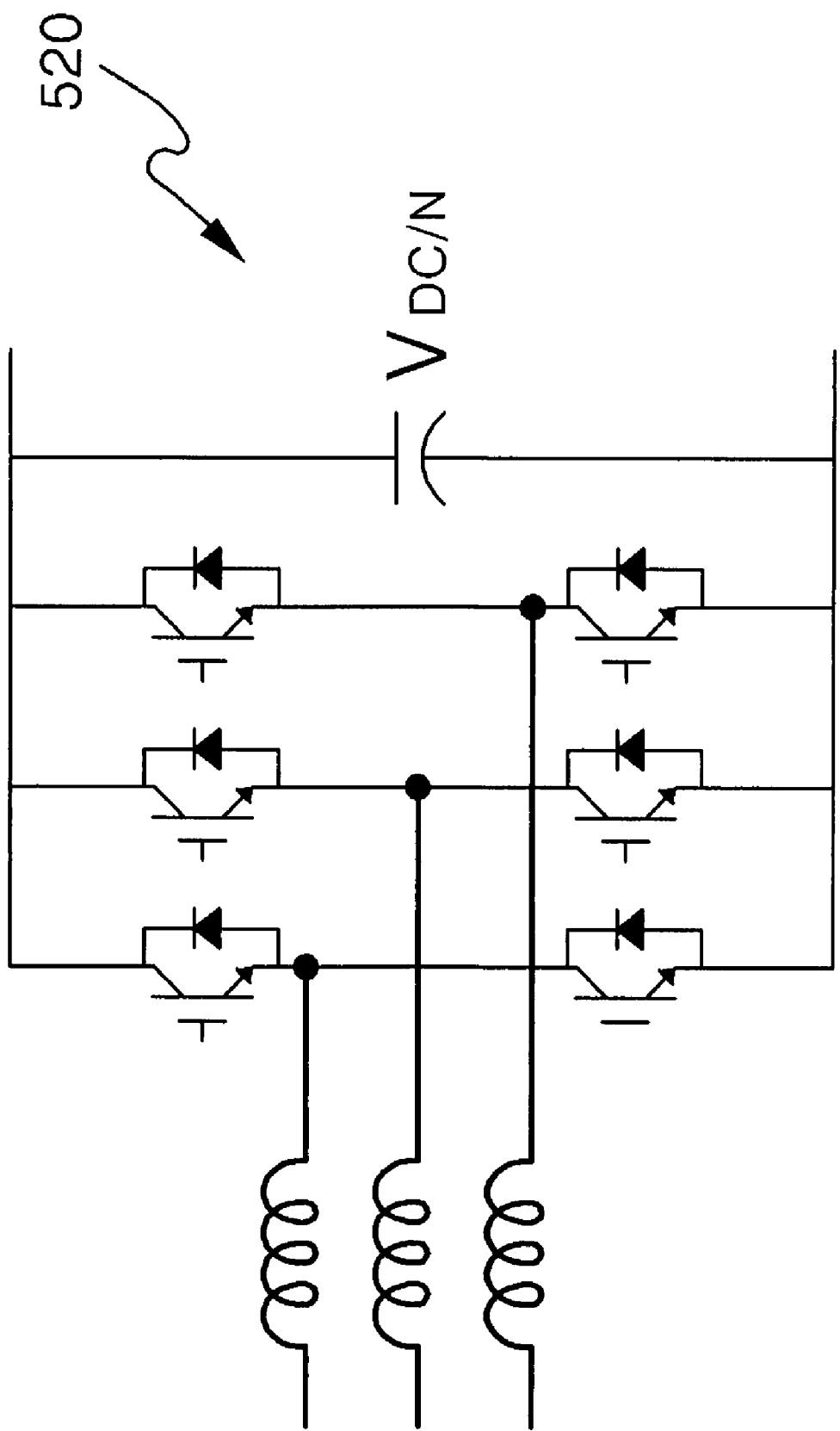
FIG. 8 is a circuit diagram illustrating one of the same N boost converters shown in FIG. 5.

FIG. 8 is a circuit diagram illustrating the boost converter shown in FIG. 5. The boost converter 520 is composed of a 3-leg IGBT and a boost inductor for generating a direct current voltage from its source required by the H-bridge multi-level converter 510. The boost converter 520 performs a function of controlling the power factor of the stator coil, a fault ride-through function of supplying a reactive power to the grid when the grid voltage becomes unstable, and an anti-islanding function of inputting a white noise for easily preventing the islanding.

In addition the structural features, the boost converter uses an algorithm using as the frequency used in the rotor coil of the DFIG a slip frequency calculated from the grid frequency subtracted from the rotating frequency of the generator for making the voltage frequency generated through the stator coil equal to the grid frequency to meet a control strategy. The magnitude of power used in the rotor coil of the DFIG uses the slip power obtained from a control strategy that makes an active power flowing through the stator coil converged into a target value. To detail this, when the active power to be generated through the stator coil is designated Ps, power (s×$P_s$) multiplied by a slip (s) is supplied through the rotor coil, thereby accomplishing the control. Accordingly, the frequency and the magnitude of the active power generated in the stator coil can be controlled by the rotor coil so that the DFIG can be controlled.

The present invention is also different from the related art in that several control methods (e.g., fault ride-through, power factor control, anti-islanding) are incorporated for overcoming the existing problems under an abnormal voltage condition since the purpose is to control the DFIG applied to the grid coupled type dispersed power generation facility.

In addition, the present invention provides a synchronization function of the multi-level converter for preventing an inrush current from occurring when the stator coil is coupled with the grid.

Figure 9:
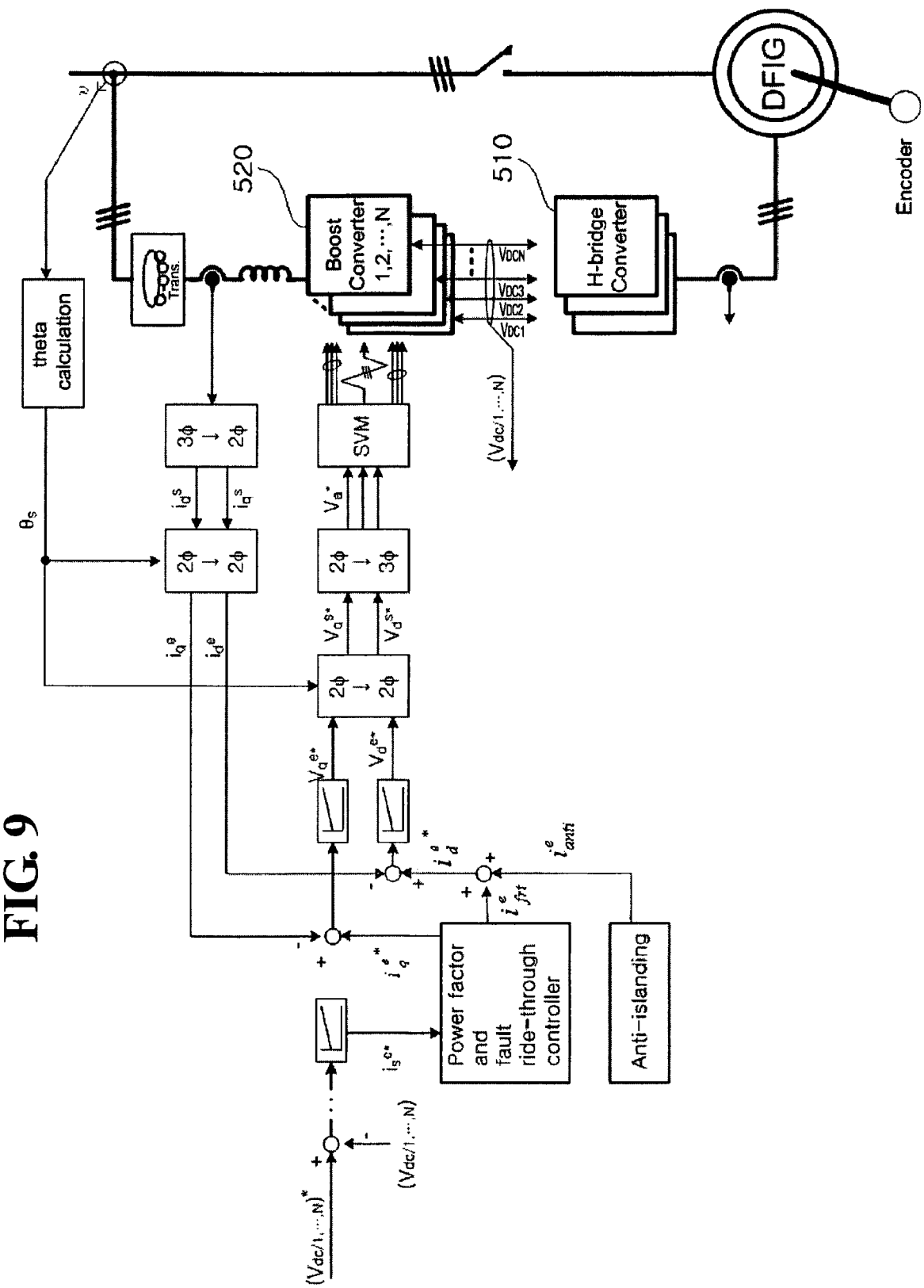
FIG. 9 is a block diagram illustrating a control algorithm for a boost converter shown in FIG. 5.

FIG. 9 is a block diagram illustrating an algorithm for driving the boost converter for the purpose of controlling the DFIG. FIG. 9 illustrates an algorithm for controlling the boost converter according to embodiments of the present invention. The algorithm is applied in the same way to each of N boost converters 520 for having a direct current voltage source. Compared to the method of making a voltage source using a diode rectifier, as this algorithm uses the boost converter shown in FIG. 8, it is advantageous in that the voltage can be easily made without changing the power supply voltage or the transformer of the input end even when the DC_link voltage specification is changed. In addition, it has a fault ride-through controller and an anti-islanding controller, so that it can supply a reactive power when the grid voltage becomes unstable and can input a white noise for easily preventing islanding.

The algorithm is composed of constantly controlling N independent direct current voltage sources, performing fault ride-through control by means of power factor control and performing d-axis current input control having a white noise characteristic for promoting anti-islanding.

A coordinate transformation method used in the control algorithm for the boost converter is the same as the existing low voltage control method. When the three-phase grid voltage is received for transformation to a d-q coordinate system, a PLL method of searching for a coordinate transformation angle ($\theta_s$) until the d-axis voltage component becomes zero may be used, which value is used to prepare for the coordinate transformation. A method of transforming a three-phase rest coordinate system parameter to a two-phase rest coordinate system (3φ→2φ) or transforming a two-phase rest coordinate system parameter to a d-q rotating coordinate system parameter (2φ→2φ), and several kinds of PWM methods may be used to control the magnitude of the current flowing between the grid and the direct current link terminal so as to follow the reference current.

However, the same number (N) of direct current voltage sources required in the multi-level converter as that of 2-legs is needed, so that output voltages ($V_{DC/1, \ldots, N}$) of the boost converter for ensuring N independent direct current voltages are measured, which are then compared to a predetermined reference value to calculate an error voltage and determine the potential q-axis current reference value ($i_q^{e*}$) to be adjusted in accordance with the magnitude of the error.

The fault ride-through controller block is different from that using a concept for controlling the power factor always to be one in the existing low voltage control method, and is designed to set the power factor reference value between 0 and 1 in accordance with the magnitude of the grid voltage using the equation 1 below. A reference value (slop*) with respect to the slope for reducing the power factor reference value in the equation 1 is a predetermined value. A current value ($i_s^{e*}$) obtained from the controller output for controlling the output voltage to be always constant is multiplied by a power factor reference value to determine the q-axis current reference value required by the boost converter as done in the equation 2 below. And a d-axis current reference value ($i^e_{frt}$) required for supplying a reactive power in a short interruption mode from the power factor reference value and the q-axis current reference value is determined by the equation 3 below. And an adjustment constant ($K_{frt}$) was added to adjust a magnitude of a reactive current to be supplied as in the pattern shown in FIG. 12 and a block for limiting the power factor reference value to the equation 4 for preventing the value from exceeding the maximum upper limit because it has a mathematically disabled value in a region where the power factor reference value falls to zero.

Figure 10:
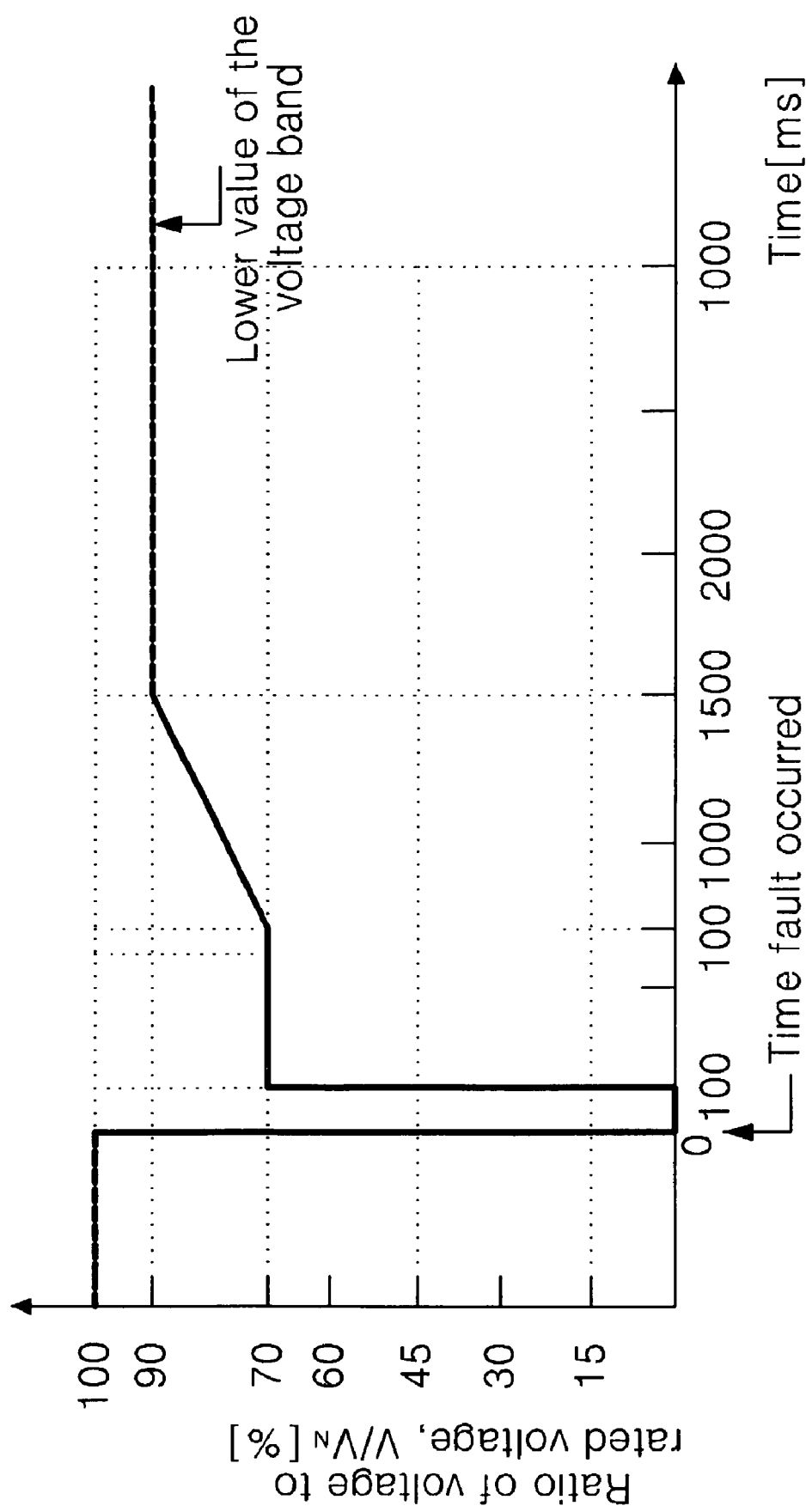
FIG. 10 is a graph illustrating a short interruption to be overcome.
Figure 11:
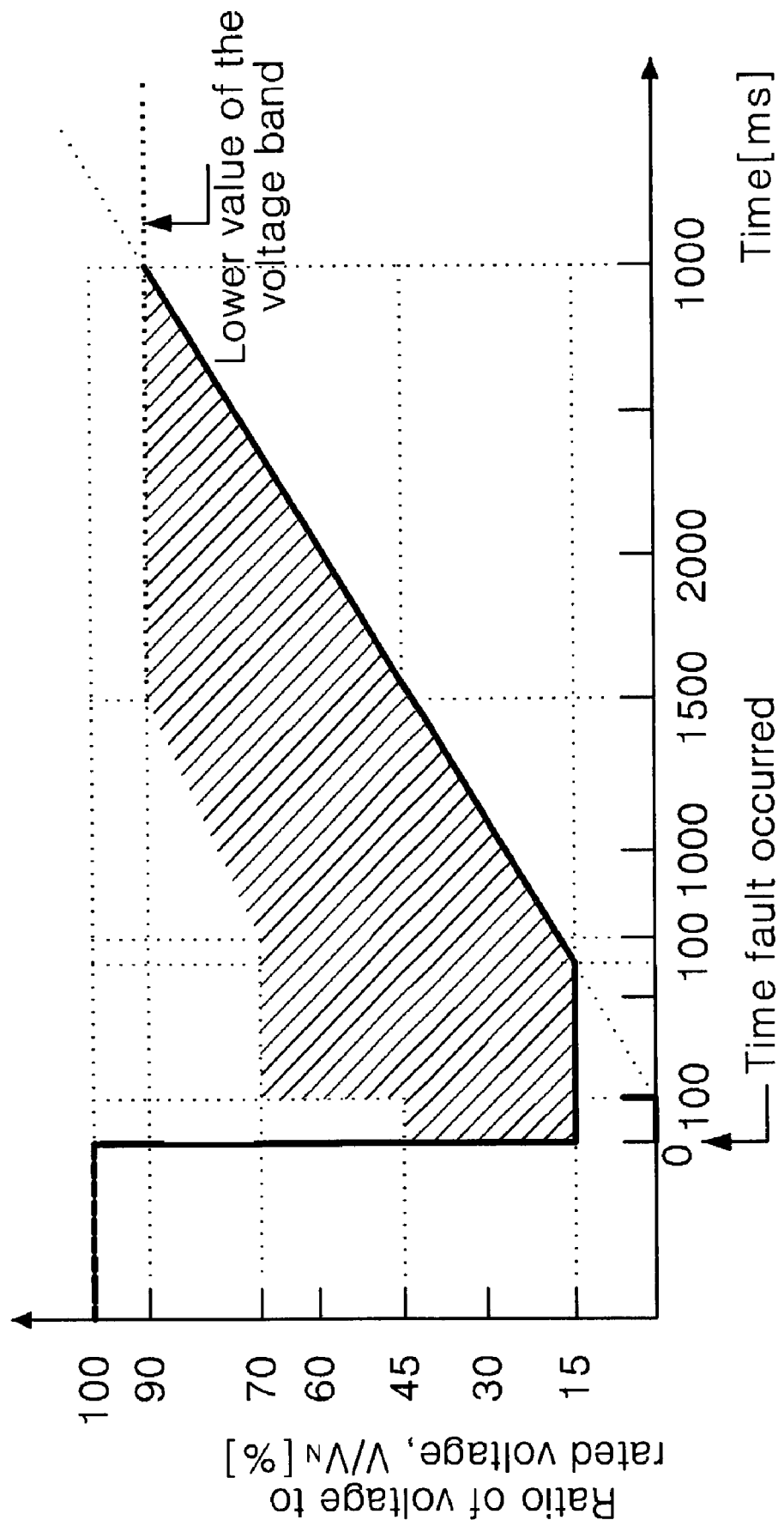
FIG. 11 is a graph illustrating an example of regulations that a reactive power must be supplied to the grid without isolating the dispersed power generation facility from the grid under a short interruption condition shown in FIG. 10.

FIG. 10 illustrates a regulation (EON Netz Standard) on the short interruption of the grid voltage to be overcome without stopping the drive. FIG. 11 illustrates the time that must be maintained in accordance with the magnitude of voltage drop without immediately isolating the dispersed power generation facility from the grid under an abnormal condition of the grid voltage. The hatching line indicates the obligation to supply the reactive power in a region that does not correspond to the isolation condition. Such a regulation is not introduced in Korea yet, however, it is a standard required by a generation company for being adopted, so that it is determined to be an important function of the dispersed power generation facility.

Figure 12:
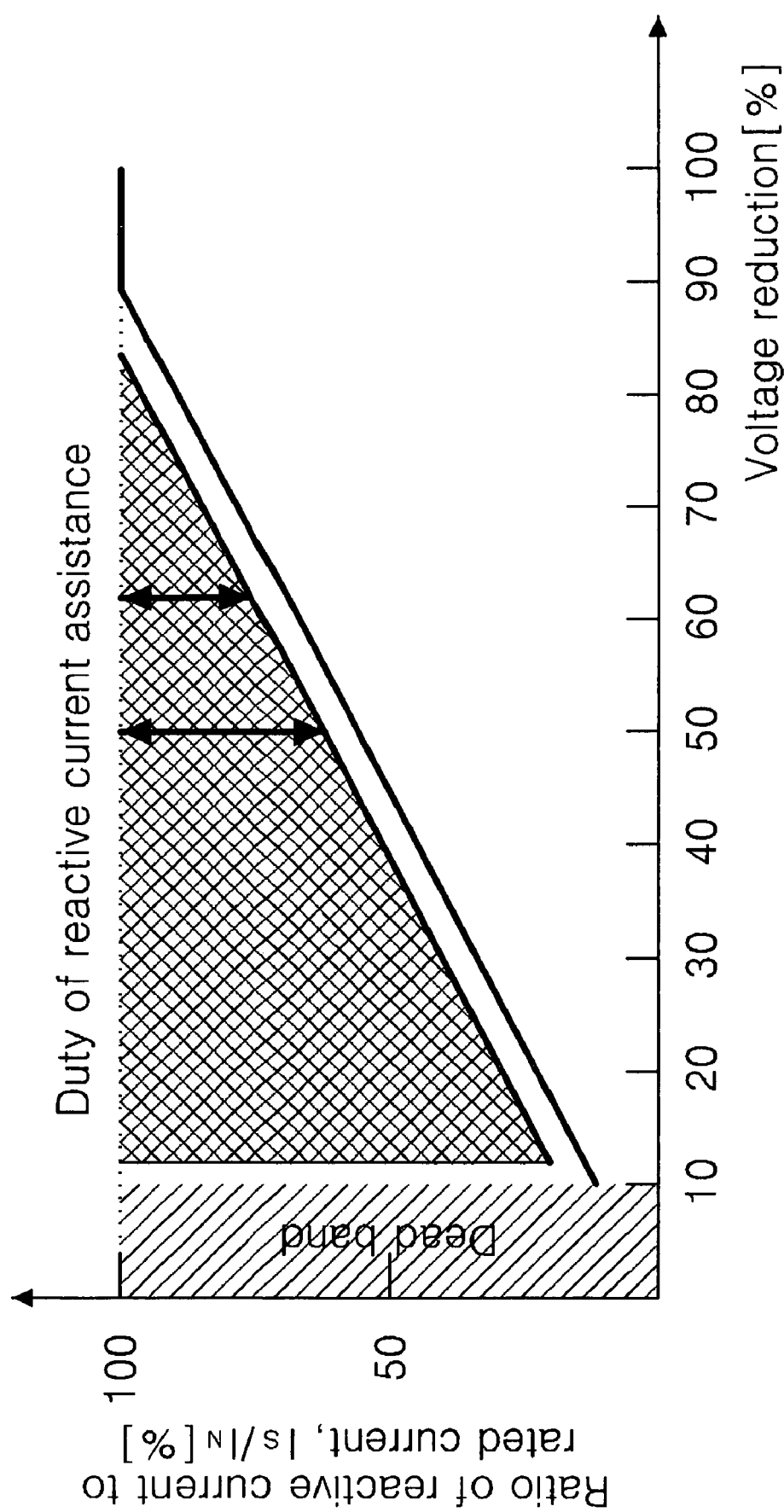
FIG. 12 is a graph illustrating an example of the defined magnitude of the reactive current that the dispersed power generation facility must supply so as to maintain the grid voltage in accordance with a magnitude of a voltage drop.

FIG. 12 illustrates a pattern for cooperative drive and for controlling the reactive current to be supplied by the dispersed power generation facility in order to maintain the grid voltage in accordance with the magnitude of the voltage drop. This function is performed by the fault ride-through block in the present invention.

$$\eta^* = 1 - |slop^*| \times \Delta e \quad \text{Equation 1}$$

$$i_q^{e*} = \eta^* \times i_s^{e*} \quad \text{Equation 2}$$

$$i_{frt}^{e*} = k_{frt} \times i_q^{e*} \times \sqrt{\frac{1}{(\eta^*)^2} - 1} \quad \text{Equation 3}$$

$$\text{If } i_{frt}^{e*} > i_s^{e*}, \text{ then } i_{frt}^{e*} = i_s^{e*} \quad \text{Equation 4}$$

Figure 13:
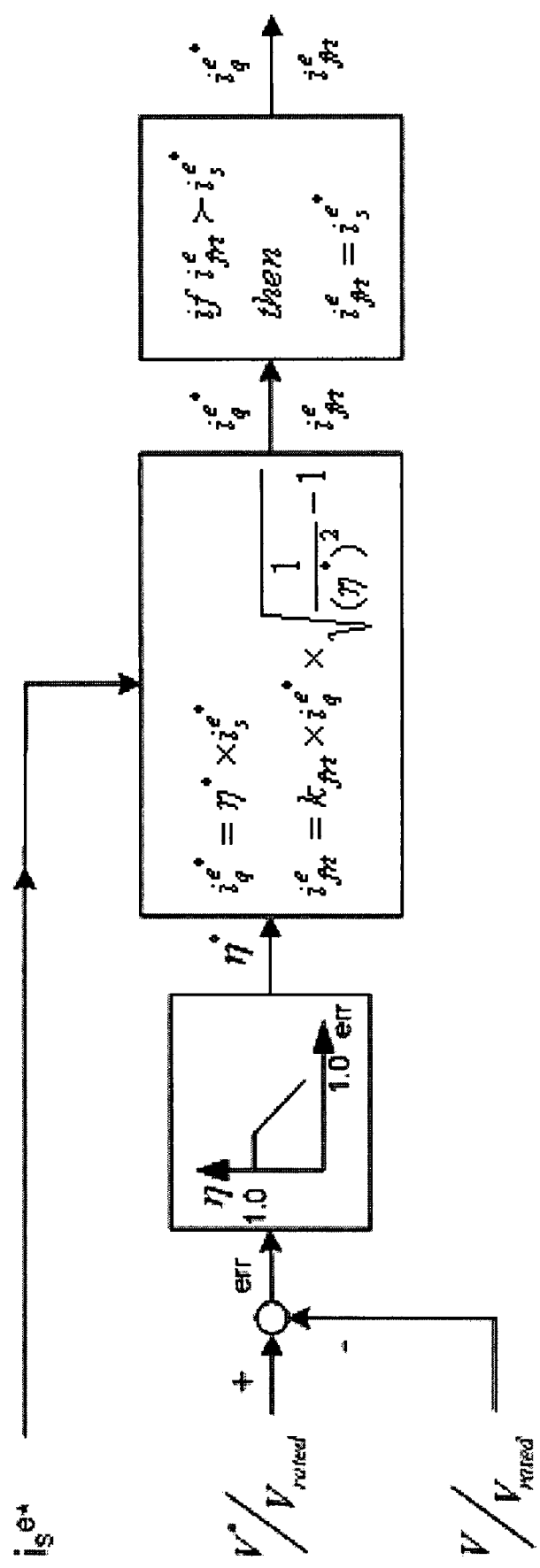
FIG. 13 is a block diagram illustrating a fault ride-through control algorithm by means of the boost converter shown in FIG. 8.

Equations 1 to 4 about the fault ride-through controller for overcoming the short interruption without stopping the short interruption defined by FIG. 11 are illustrated as a block diagram in FIG. 13. FIG. 13 illustrates the fault ride-through blocks represented in the boost converter control algorithm in detail. It indicates that the power factor reference value is set to be lower in accordance with the voltage drop and then is distributed to the current of active power component and the current of reactive power component in accordance with the set power factor value.

When the power factor reference value is determined to be lower in accordance with the magnitude ($\Delta e$) of the grid voltage drop by the equation 1 and the reactive current component so as to supply the reactive power in accordance with the power factor reference value is determined by the equation 3, the grid voltage can be restored within 1.5 second in a case of short interruption. When the grid power source is not restored above the predetermined path (FIG. 11) or the frequency variation (df/dt) is out of a tolerance range while the cooperative drive is performed, the dispersed power generation facility is made to stop for preventing a drive accident.

When an electrical power interruption occurs, the fault ride-through block allowing the reactive power to be supplied works, however, when a power generated in the dispersed power generation facility and the power consumed in the load are in equilibrium or near equilibrium, the fault ride-through block does not work since the voltage can be maintained within a tolerance range and the frequency variation (df/dt) can be fallen to a lower speed within the tolerance range even when the grid voltage is interrupted, so that a separate method is required for promoting the grid frequency to be fast varied in the electrical power interruption interval. This is performed by the block of inputting the reactive current for anti-islanding.

Figure 14:
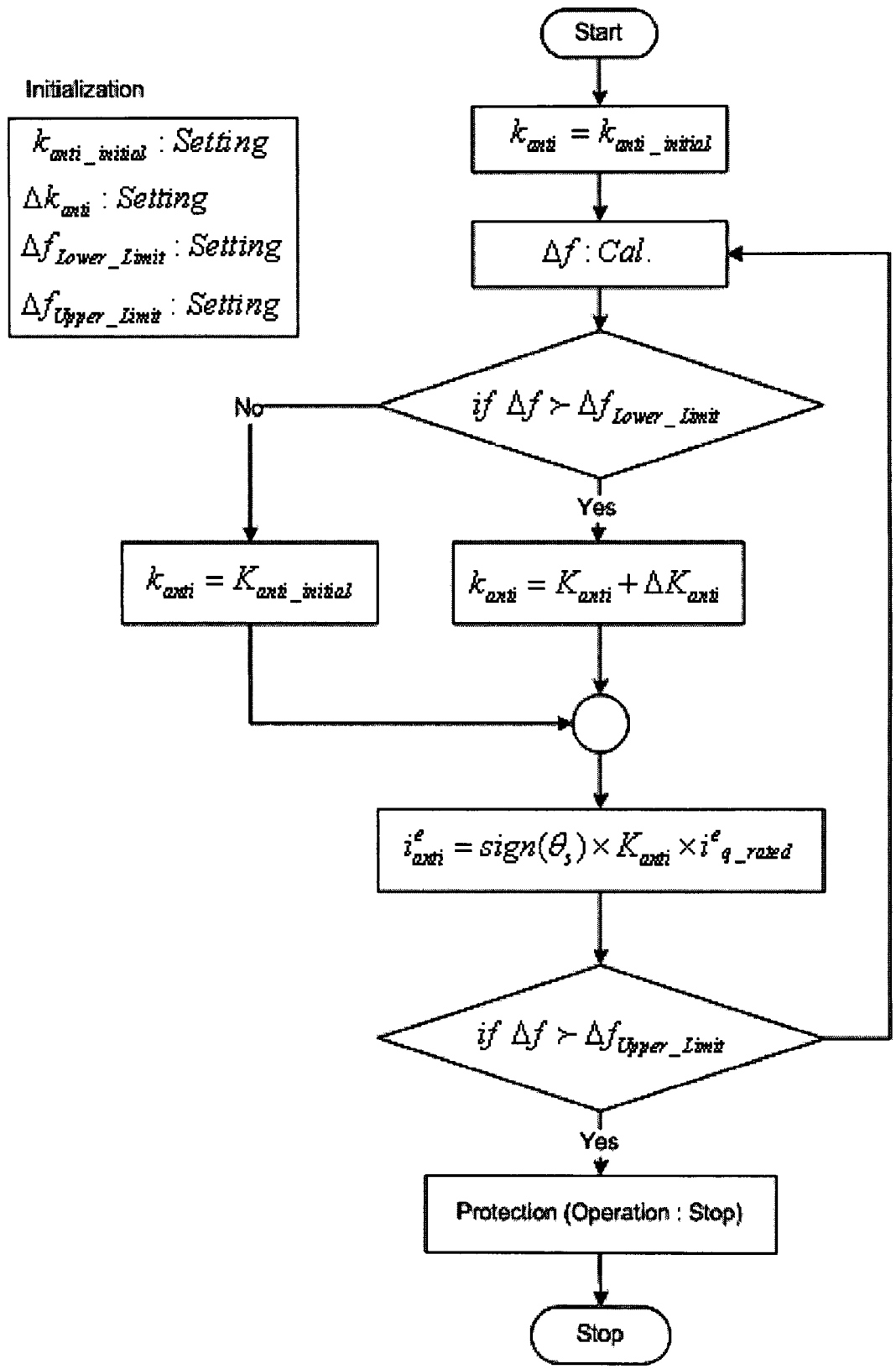
FIG. 14 is a flow chart illustrating an anti-islanding algorithm by means of the boost converter shown in FIG. 8.

To describe the method of inputting the reactive current for anti-islanding, its basic concept is to include a white noise having '0' as it average to the d-axis current associated with the reactive power component in an entire time band. To detail this, signs of the voltage phase angle ($\theta_s$) varying between $-\pi$ and $+\pi$ are used to determine a noise sign alternating between a +signal and a −signal, and the q-axis rated current ($i_{q\_rated}$) is multiplied by the adjustment constant ($k_{anti}$) to determine a magnitude of the noise as shown in equation 5. When the frequency variation width ($\Delta f$) is above a predetermined reference value ($\Delta f_{Upper\_Limit}$), it is expected that there exists a high possibility of isolation mod and the equation 6 is used to increase the signal magnitude by the increment ($\Delta k_{anti}$) to supply the increased d-axis current component as a reactive power component. When the frequency variation width ($\Delta f$) is below a predetermined reference value ($\Delta f_{Lower\_Limit}$), the adjustment constant ($k_{anti}$) is readjusted so as to reduce the reactive power component by the initially set d-axis current. This is illustrated as a block diagram in FIG. 14. FIG. 14 is a diagram illustrating an anti-islanding function represented in the boost converter control algorithm, which acts to supply the increased current of the reactive power component when the frequency variation is sensed to make the frequency variation greater under the condition that the grid voltage is interrupted, thereby isolating the dispersed power generation facility from the grid within 14 cycles, and under the condition that the grid voltage is not electrically interrupted, the frequency variation is not significant and will be restored to a normal range so that an abnormal operation such as drive stopping does not occur even when the reactive power is instantaneously increased and supplied.

$$i^e_{anti} = \text{sign}(\theta_s) \times K_{anti} \times i_{q\_rated} \quad \text{Equation 5}$$

$$k_{anti} = K_{anti} + \Delta K_{anti} \quad \text{Equation 6}$$

The H-bridge converter coupled to the rotor coil of the DFIG must control the voltage frequency regenerated to the grid through the stator coil to be always the frequency of power source (60 Hz) regardless of the rotating frequency of the DFIG, so that a basic stage for coupling with the grid is prepared. To this end, a slip angle ($\theta_{slip}$) is used in the coordinate transformation block in order to make the rotor flux rotating at a slip frequency which is the measured frequency of which the DFIG is rotating is measured and then is subtracted by the frequency of power source.

The H-bridge converter must control the generator so as to make always constant the power (active power and reactive power) to be regenerated to the grid through the stator coil regardless of the rotating speed of the generator. To this end, a relationship that the active power ($p_s$) of the stator side to be regenerated through the stator coil can be independently controlled by the q-axis current of the rotor side is used to design the q-axis current controller.

Figure 15:
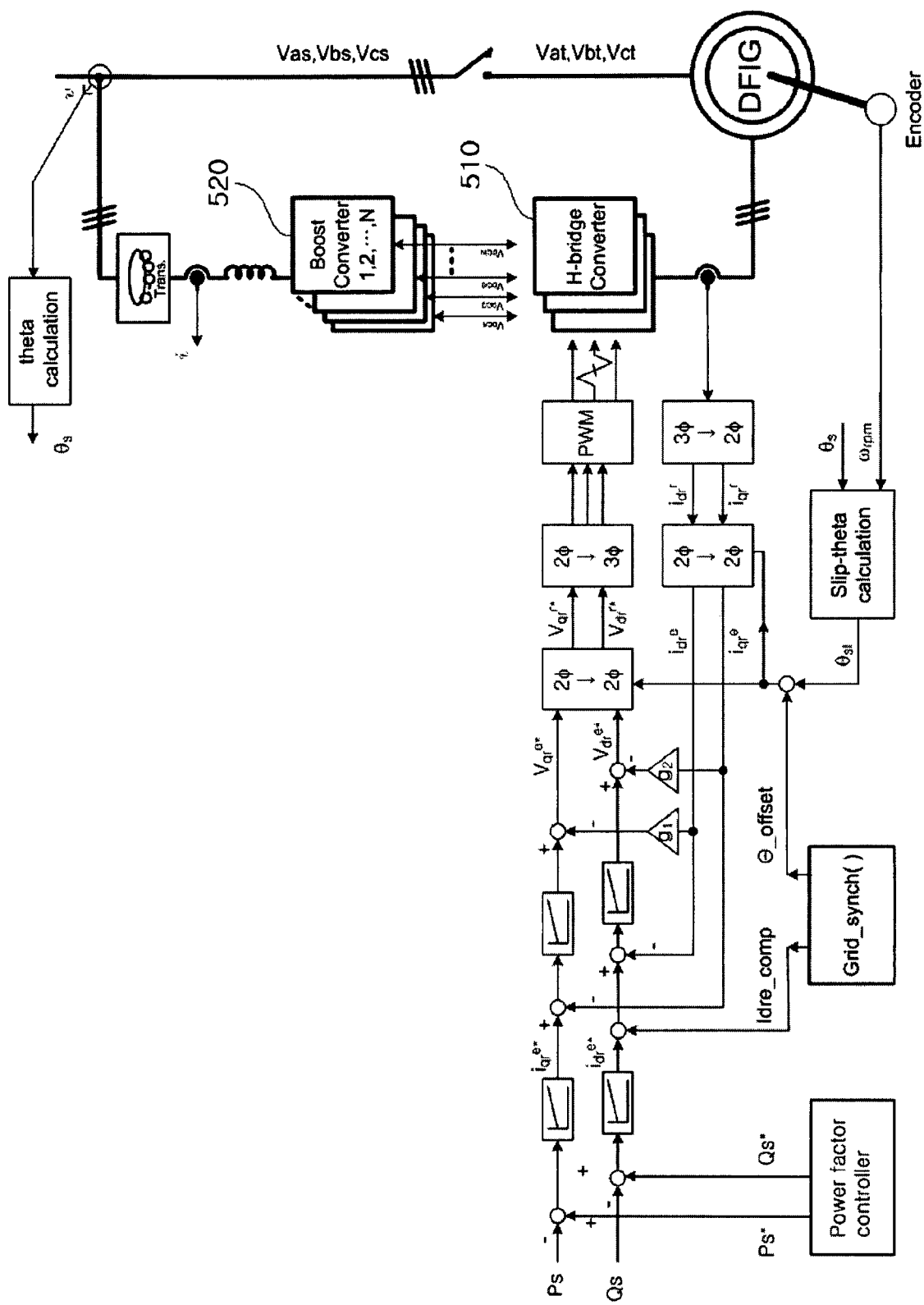
FIG. 15 is a block diagram illustrating a grid coupled type H-bridge converter control algorithm for controlling the doubly-fed induction generator (DFIG) shown in FIG. 7.

In addition, a relationship that a reactive power ($Q_s$) to be regenerated through a stator coil can be independently controlled by the d-axis current of the rotor side is used to design the d-axis current controller. A grid coupled type H-bridge converter control algorithm for controlling the DFIG is shown in FIG. 15. FIG. 15 illustrates a grid coupled type H-bridge converter control algorithm for controlling the DFIG provided by the present invention. It illustrates controlling the active power and the reactive power, which is characterized in the d-axis current controller and the slip angle ($\theta_{slip}$) required for coordinate transformation. It illustrates a structural block for power factor control and grid voltage synchronization newly added to the controller structure used in the 2-level voltage converter The present invention provides a power factor controller and a grid synchronization block in the H-bridge converter coupled to the rotor coil of the DFIG.

Figure 16:
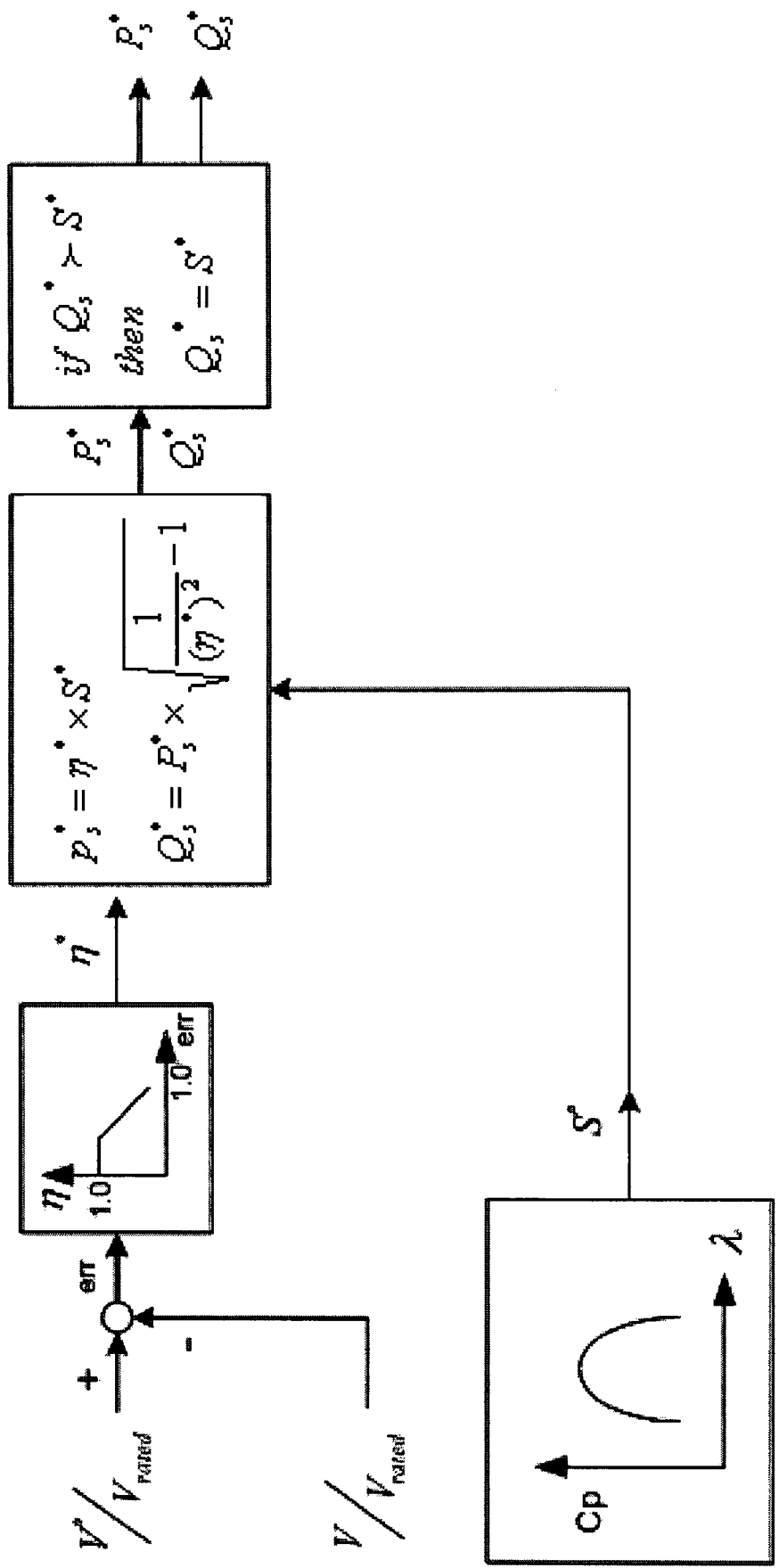
FIG. 16 is a block diagram illustrating a controller for a power factor of a grid coupled type H-bridge converter side for controlling DFIG shown in FIG. 7.

In order to recover the maximum energy by means of a blade, a speed (or an active power, torque) can be adjusted for making the energy conversion rate maximum in the relational characteristic between the energy conversion rate ($C_p$) of the blade and the tip speed ratio ($\lambda$) which is a ratio of the angular speed to the linear speed at the tip of the blade. When the grid voltage is in a stable range after the active power reference value determined by the conventional maximum power point tracking (MPPT) method is defined as an apparent power parameter (S*), the grid voltage is transformed to an active power reference value by making the power factor reference value one, and when the grid voltage falls, the power factor reference value is set to be low using the equation 1 in accordance with the grid voltage drop to make the transformation ratio of the active power lower using the equation 7, and the rest is distributed to the reactive power reference value using the equation 8 so as to restore the grid voltage. The equation 9 is used to limit the maximum magnitude of the reactive power reference value and a process for avoiding mathematical instability is included. FIG. 16 illustrates a power factor controller block attached to the grid coupled type H-bridge converter side for controlling the DFIG. FIG. 16 is a detailed diagram illustrating a power factor controller of the grid coupled type H-bridge converter side for controlling the DFIG. FIG. 16 illustrates a method of distributing an active power reference value and a reactive power reference value after the power reference value obtained from the well known MPPT control algorithm is defined as the power of the intermediate stage and the power factor reference value is determined to be different in accordance with the grid voltage drop.

$$P_s^* = \eta^* \times S^* \qquad \text{Equation 7}$$

$$Q_s^* = P_s^* \times \sqrt{\frac{1}{(\eta^*)^2} - 1} \qquad \text{Equation 8}$$

$$\text{If } Q_s^* > S^*, \text{ then } Q_s^* = S^* \qquad \text{Equation 9}$$

When the DFIG is coupled to the grid to supply a dispersed power to the grid, the first thing to do electrically is to synchronize voltage vectors (magnitude, frequency, phase) generated in the stator coil of the DFIG with the grid voltage vectors.

A synchronization control method within the H-bridge multi-level converter control algorithm is described as follows. When the d-axis voltage component and the q-axis voltage component of the grid side are defined as $V_{ds1}$, $V_{qs1}$ and the d-axis voltage component and the q-axis voltage component of the voltage induced to the stator coil of the DFIG are defined as $V_{ds2}$, $V_{qs2}$, respectively, a voltage difference at both ends is calculated from the equations 10 and 11 below.

$$\Delta V_{ds} = V_{ds1} - V_{ds2} \qquad \text{Equation 10}$$

$$\Delta V_{qs} = V_{qs1} - V_{qs2} \qquad \text{Equation 11}$$

A PI controller having an error ($\Delta V_{ds}$) with respect to the d-axis voltage component as an input was used and an output of the PI controller was designated a compensation angle ($\theta_{offset}$) for compensating for the existing slip angle ($\theta_{slip}$) which was calculated using the equation 12. When the slip angle ($\theta_{slip}$) used for the coordinate transformation using the compensation angle is compensated as done in the equation 13, a phase having the same stator frequency as the grid frequency can be always generated without being subject to the encoder mounting angle.

$$\theta_{offset} = PI(\Delta V_{ds}) \qquad \text{Equation 12}$$

$$\theta_{slip} = \theta_s - \theta_r \theta_{offset} \qquad \text{Equation 13}$$

The controller was designed using the equation 14 to have the d-axis compensation current ($i_{dre\_comp}$) for compensating for the existing d-axis current value in accordance with the magnitude of the error ($\Delta Vqs$) with respect to the q-axis voltage component.

$$i_{dre\_comp} = PI(\Delta V_{qs}) \qquad \text{Equation 14}$$

In order to apply an automatic synchronization method to the control algorithm of the doubly-fed induction generator regardless of control manner, the equation 15 below is used to design the d-axis current controller.

$$\Delta i_{dr} = i^{e*}{}_{dr} - i^e{}_{dr} + i_{dre\_comp} \qquad \text{Equation 15}$$

Figure 17:
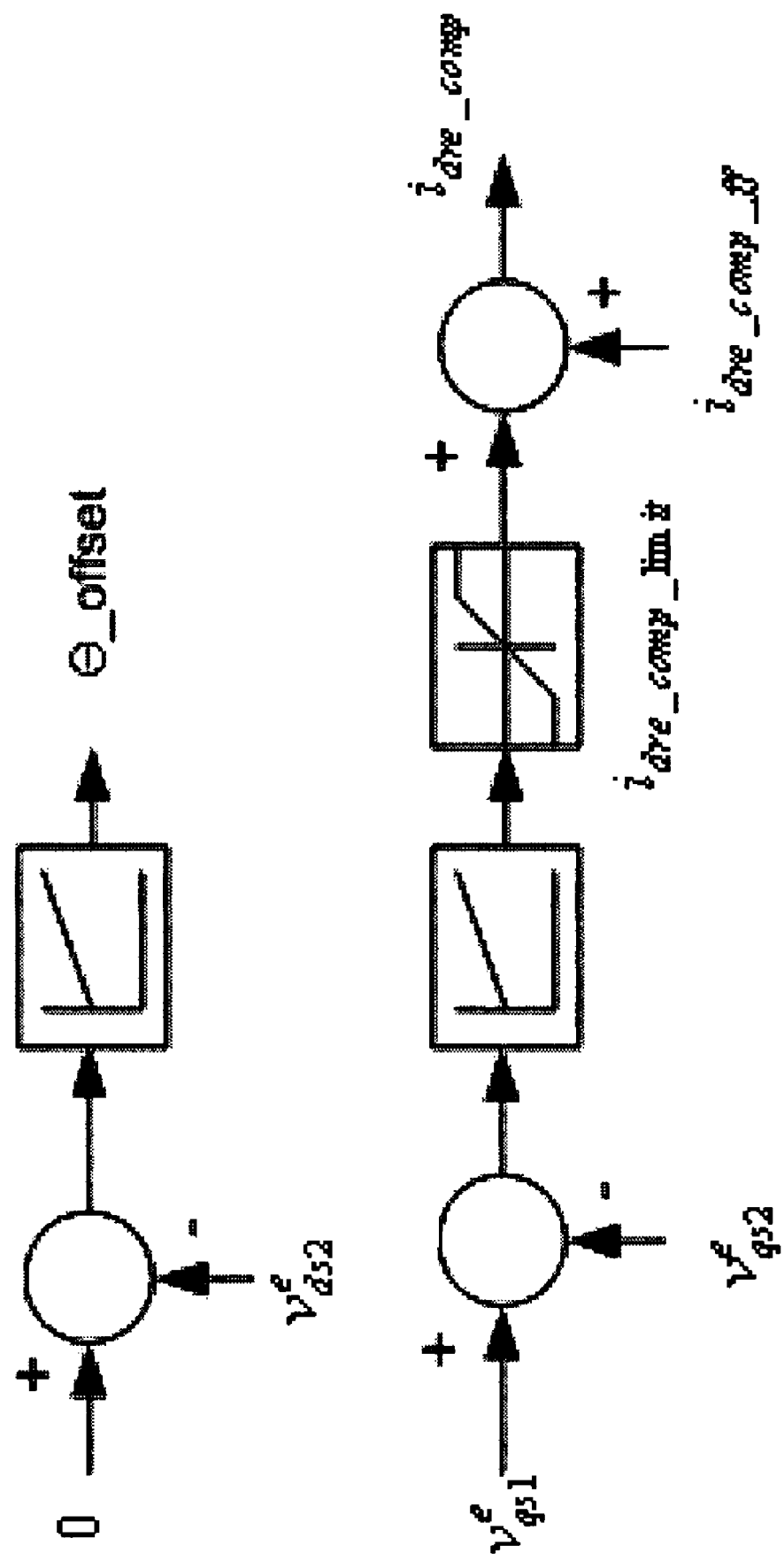
FIG. 17 is a control block diagram for synchronizing a DFIG stator voltage by means of a grid coupled type H-bridge converter for controlling DFIG shown in FIG. 7.

By doing so, a switch such as SCR is not required between the grid voltage and the stator coli for synchronizing the grid voltage with the stator voltage of the doubly-fed induction generator, and conventional problems such that synchronization is not made on the encoder mounting angle, a maximum grid voltage (E), and a frequency ($\omega_e$) have an effect on the controller, and a mutual inductance ($L_O$) as an equivalent constant of the generator has an effect on the controller can be overcome to obtain a synchronization control characteristic ensuring a robust convergence. FIG. 17 shows a synchronization method within a control block of a multi-level converter for making a stator voltage vector of the doubly-fed induction generator equal to a grid voltage vector. In this case, the $i_{dre\_comp\_ff}$ term is a parameter for enhancing a convergence speed.

PWM Method for a Multi-Level Converter and T.H.D.

Figure 18:
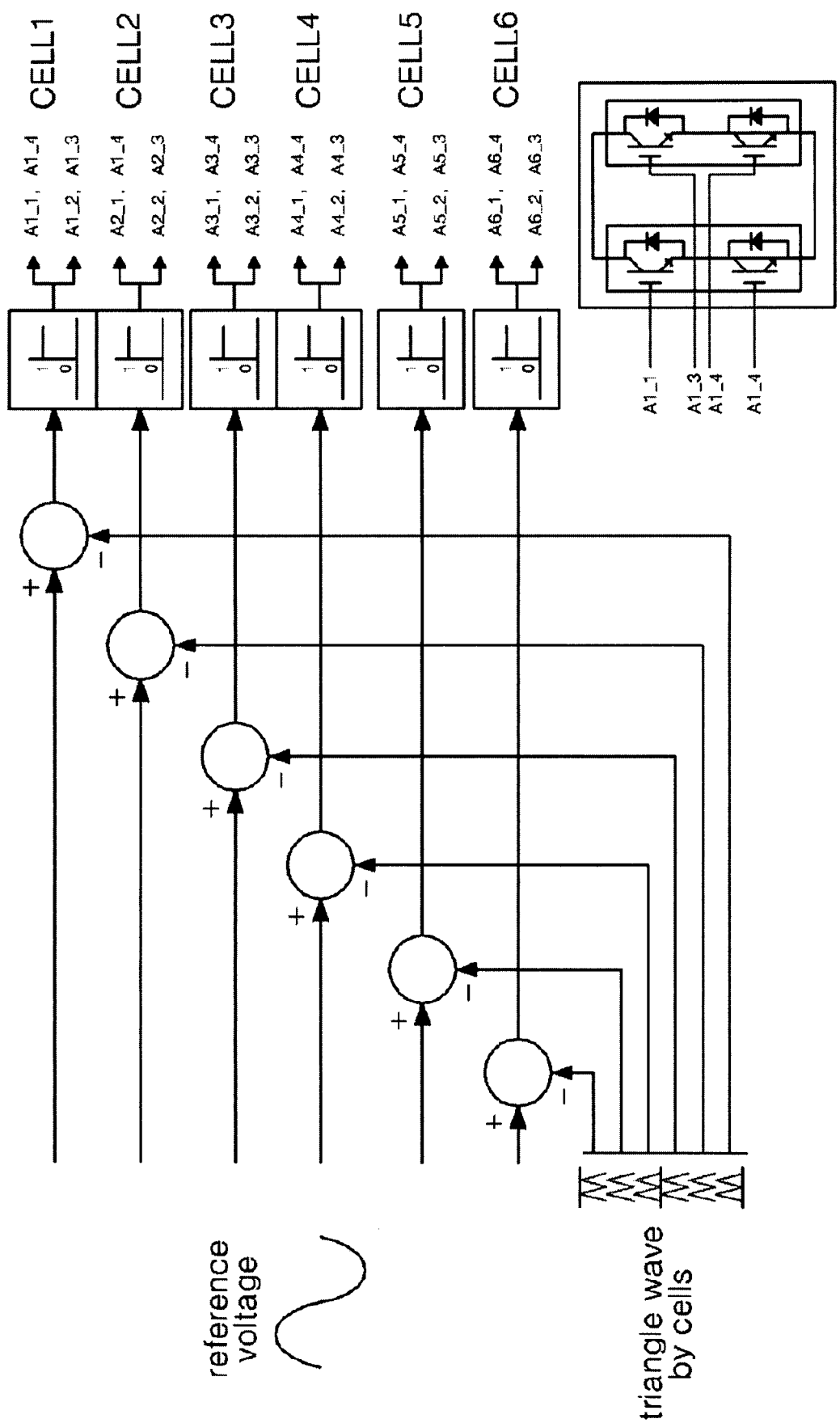
FIG. 18 is a diagram illustrating PWM by means of a grid coupled type H-bridge converter for controlling DFIG shown in FIG. 7.
Figure 19:
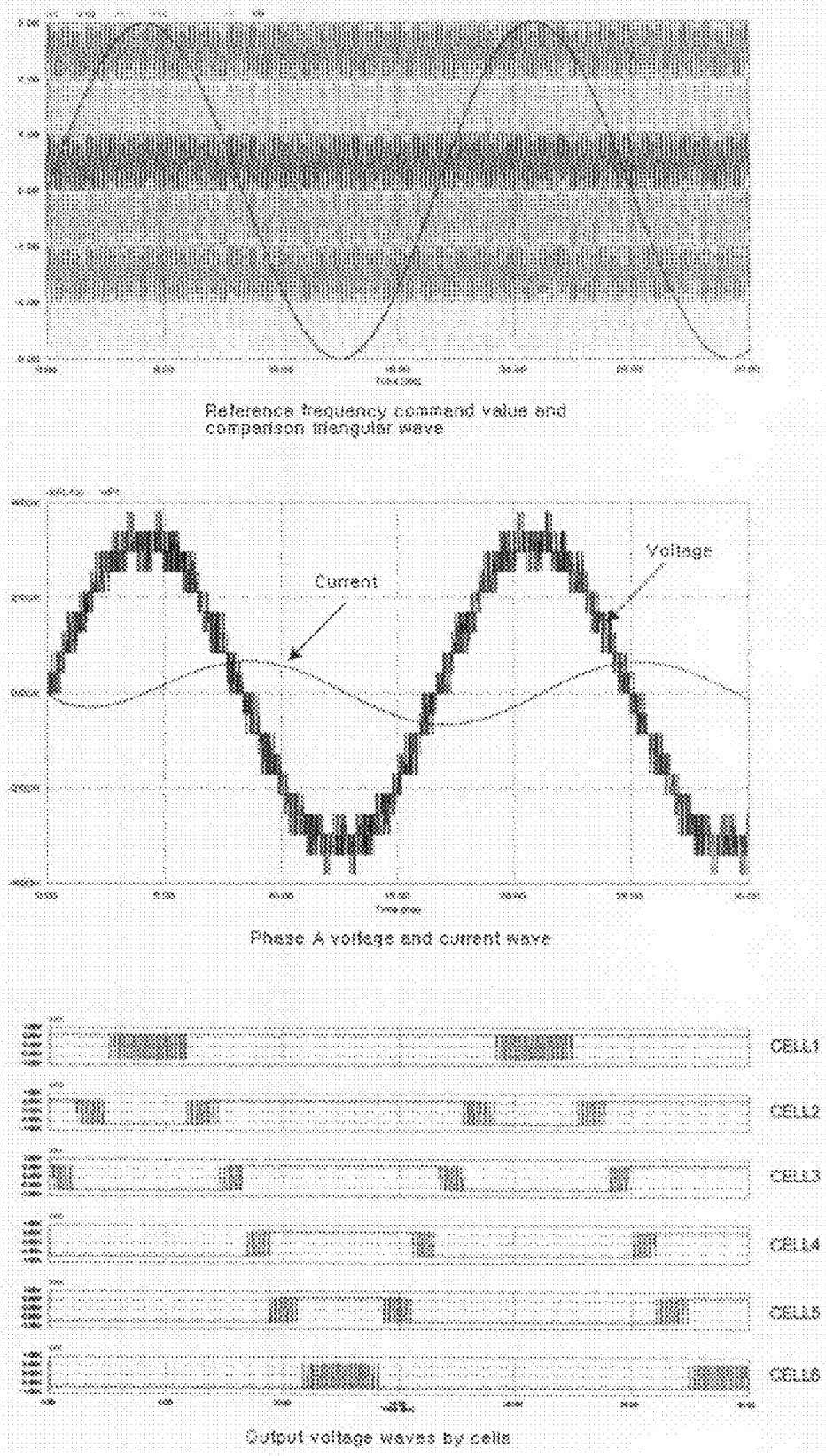
FIG. 19 is a diagram illustrating an output voltage and a current waveform of an H-bridge converter to which PWM is applied when a phase voltage frequency is 60 Hz.
Figure 20:
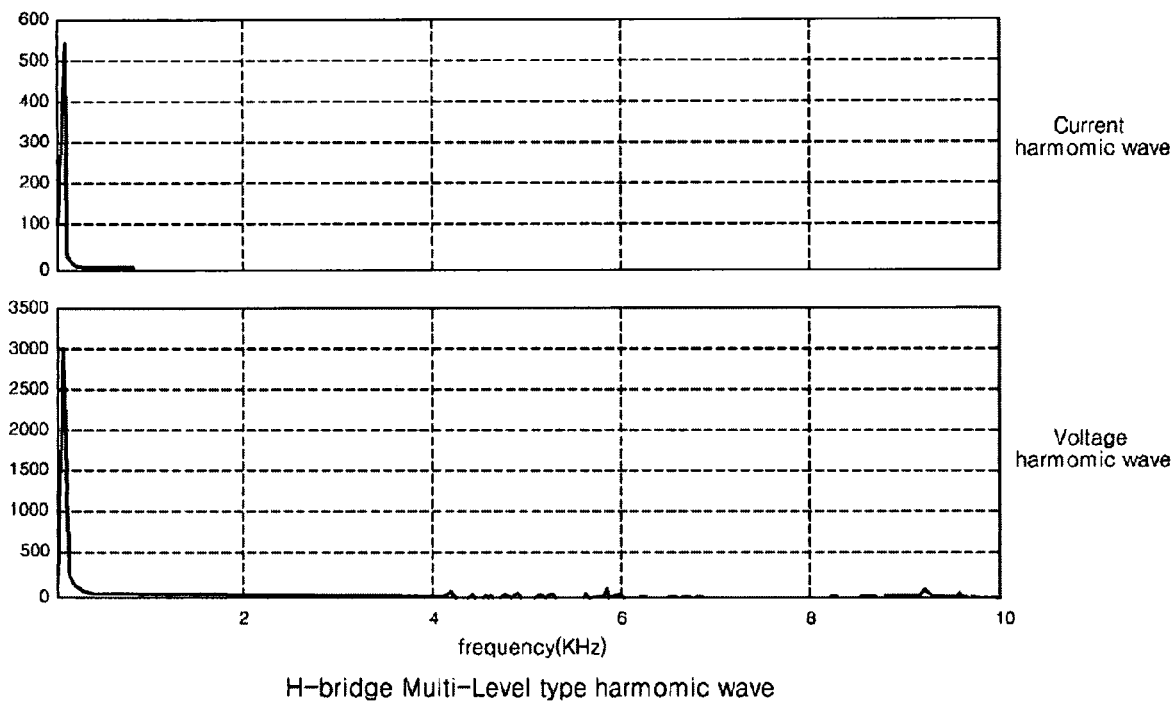
FIG. 20 is a diagram illustrating THDs between a general 2-level converter and an H-bridge multi-level converter.
Figure 20:
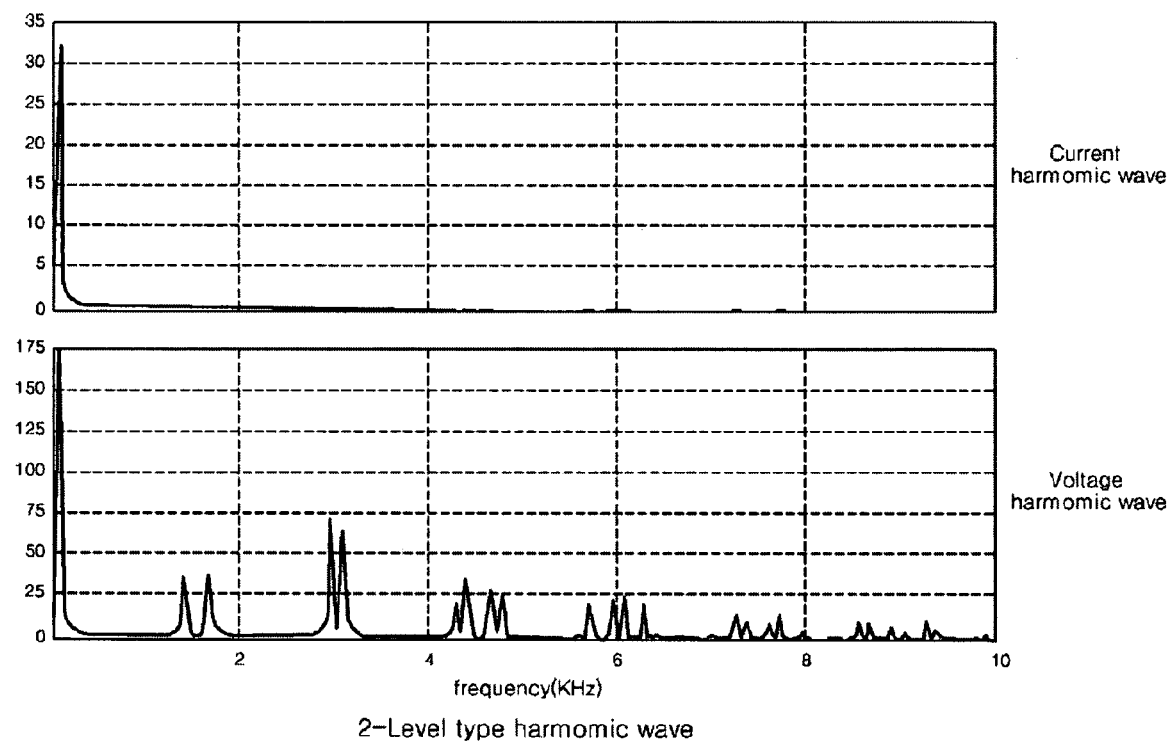

When a stator coil of a doubly-fed induction generator is coupled with a grid coil while electrical phase angles do not match each other, a very high inrush current occurs at the point of time that a switch is turned on. The magnitude of the inrush current depends on the degree of difference between the phase angles. FIG. 17 illustrates a method of controlling stator voltage synchronization of the doubly-fed induction generator, which is designed to synchronize the phase angles with each other to prevent the inrush current from occurring, protect the controller and the grid, compensate for a slip angle in accordance with a d-axis voltage error of both ends of the switch, and compensate for a magnitude of an input end signal of the d-axis current controller in accordance with the q-axis voltage error of both ends of the switch. FIG. 18 is a diagram illustrating a PWM implementation method represented within an algorithm block shown in FIG. 15 for controlling the H-bridge multi-level converter. FIG. 19 illustrates a simulation result showing that an output voltage having a multi-level characteristic can be obtained when an H-bridge type multi-level conversion method and a proper PWM method are applied thereto. FIG. 20 illustrates a simulation result showing that a voltage distortion factor can be significantly reduced when the multi-level conversion manner is applied in comparison with the 2-level conversion manner.

Implementation of the PWM with respect to the H-bridge multi-level converter 510 is controlled per each cell (CELL), so that on and off signals can be obtained by a method of comparing a phase voltage reference value of one phase with a carrier signal having a different potential allocated for each H-bridge, and FIG. 18 shows a PWM example for the 13-level converter having six H-bridges. FIG. 19 illustrates an output voltage and a current waveform when a phase voltage frequency is 60 Hz. FIG. 20 illustrates T.H.D. between a general 2-level converter and an H-bridge multi-level converter. Accordingly, when a multi-level converter topology is applied thereto, it can be seen that a voltage distortion factor can be significantly improved and a high voltage output can be generated in comparison with the 2-level converter.

Synchronization Characteristics

Figure 21:
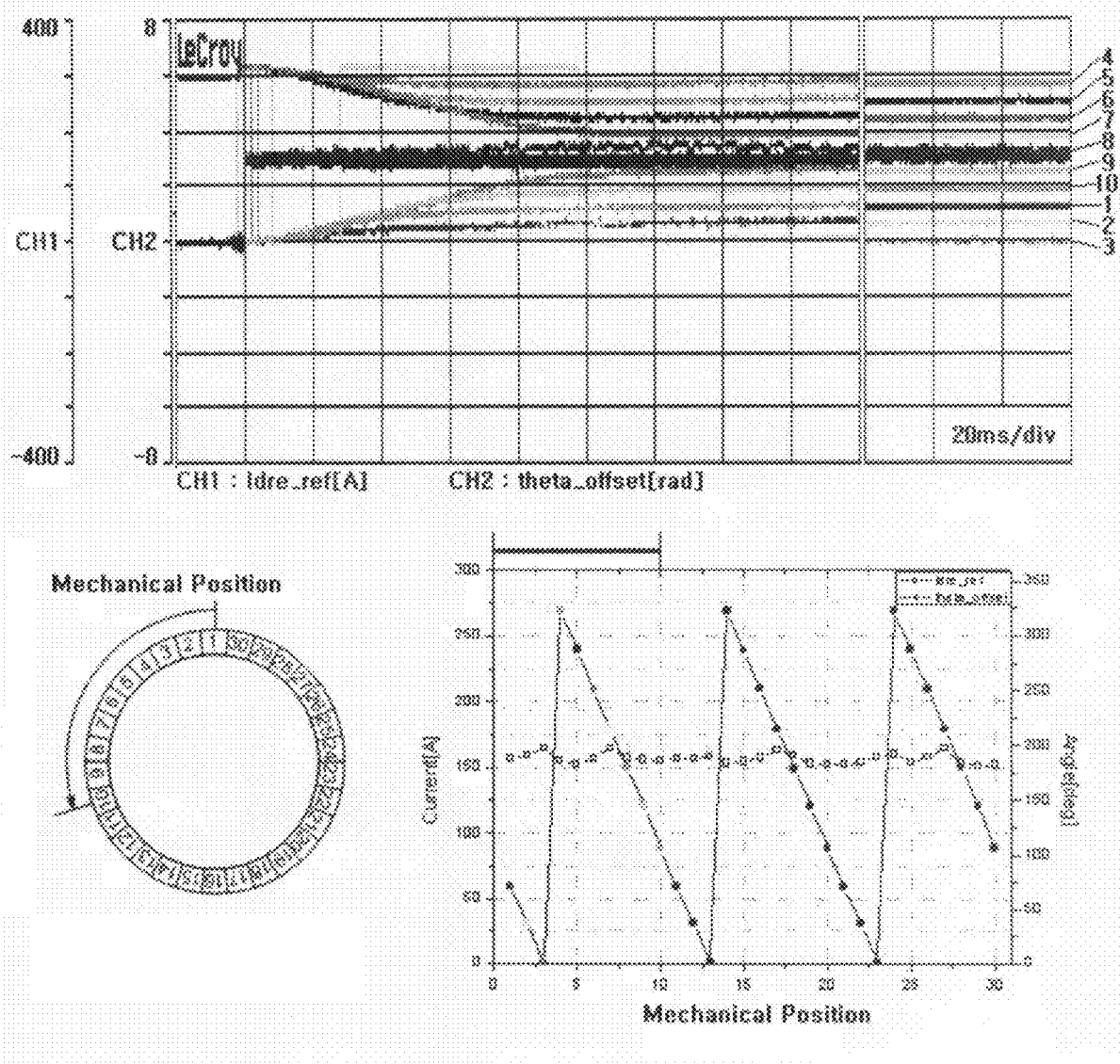
FIG. 21 is a diagram illustrating compensation angle characteristics to be updated for maintaining synchronization with respect to any mounting positions of an encoder spaced from each other by 12 in 30 sections.

When an encoder was mounted in any position, the position was divided into 30 sections each being spaced by 12 (each other to check characteristics of the compensation angle ($\theta_{offset}$) calculated by a synchronization control algorithm, which is shown in FIG. 21. FIG. 21 illustrates experimental results showing that the synchronization controller continues to search for the compensation angle for compensating the slip angle to make the voltage induced toward the stator coil equal to the grid voltage even when the encoder is mounted in any position within a 360 (range. It can be seen that the compensation angle ($\theta_{offset}$) is calculated so as to make the voltage vector of the stator equal to the voltage vector of the grid even when the encoder is mounted in any position.

Figure 22:
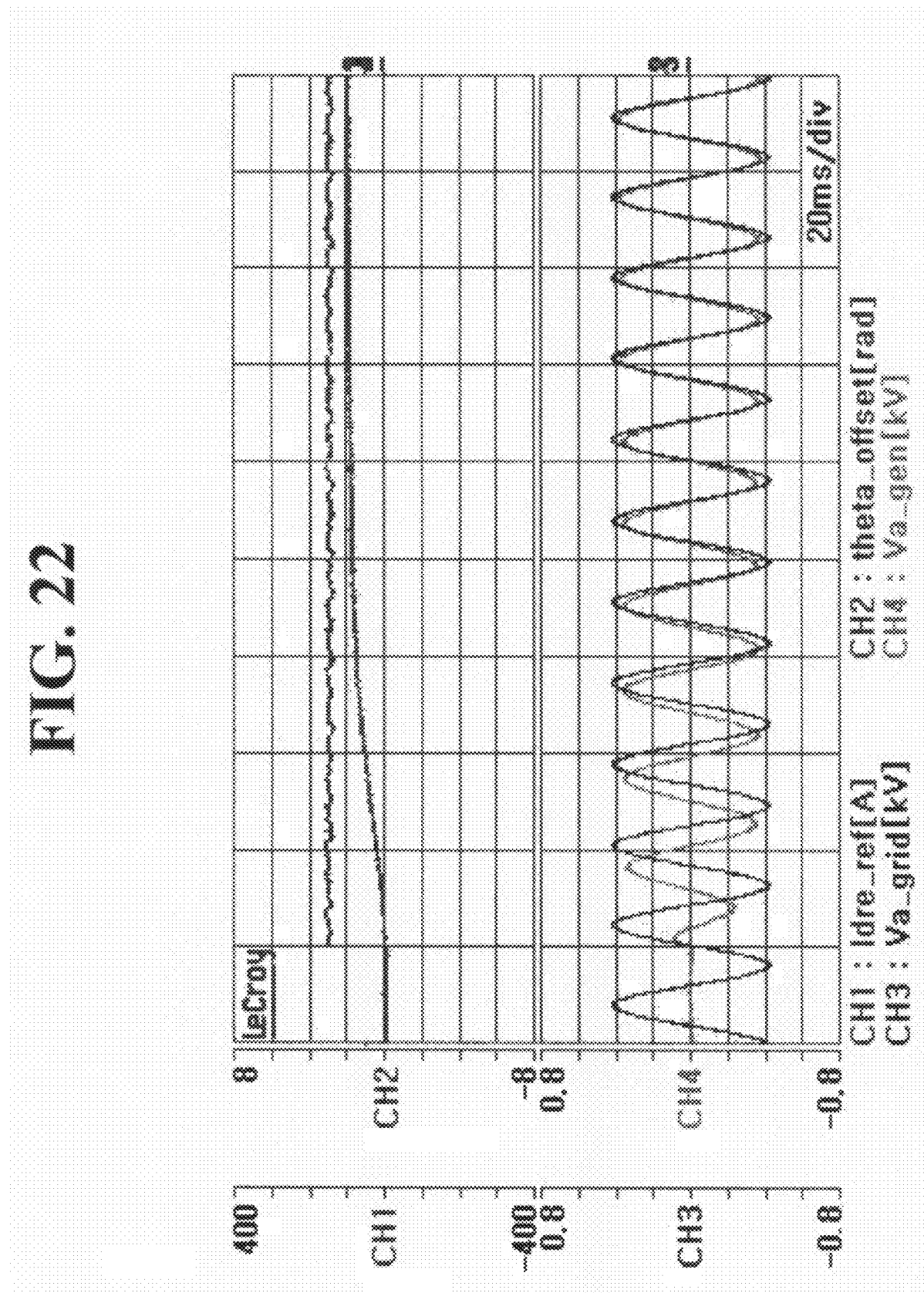
FIG. 22 is a waveform diagram illustrating a transient characteristic that a stator voltage of a doubly-fed induction generator becomes synchronized with a grid voltage when the encoder is mounted in any position.

FIG. 22 illustrates experimental waveforms showing that a stator voltage of the doubly-fed induction generator becomes synchronized with a grid voltage when an encoder is mounted in any position. It can be seen that a phase angle error is converged almost to zero after 100 ms which is significantly superior to a phase angle error tolerable in the related art, that is, 10°. That is, FIG. 22 illustrates experimental waveforms showing that the stator vector of the doubly-fed induction generator becomes synchronized with the grid voltage vector when the encoder is mounted in any position ($\theta_g$) and has any feed-forward value ($i_{dre\_comp\_ff}=E/\omega_e L_O$). It shows significantly good characteristics on all of a voltage magnitude, a frequency and a phase which are completely synchronized after 120 ms.

Figure 23:
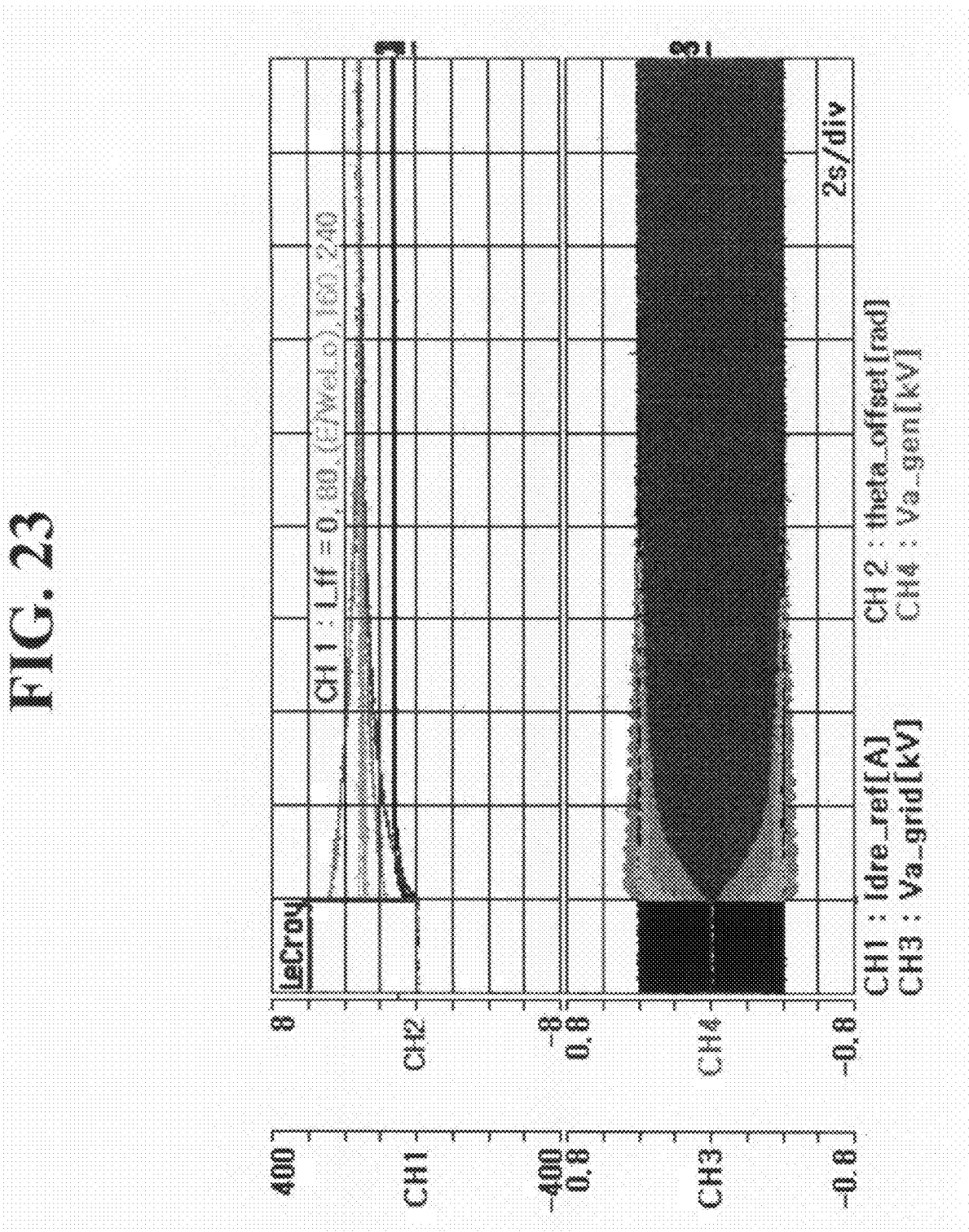
FIG. 23 is a waveform diagram illustrating that a synchronization speed can be adjusted when feed-forward parameters to be utilized as control degree of freedom are properly adjusted in a synchronization controller.

FIG. 23 illustrates experimental waveforms showing that a synchronized speed can be adjusted when a feed-forward parameter ($i_{dre\_comp\_ff}$) capable of being used as a control degree of freedom is properly adjusted in the synchronization controller. It can be seen that the feed-forward parameter can start initially from zero and can be adjusted when a converged speed needs to be increased.

Figure 24:
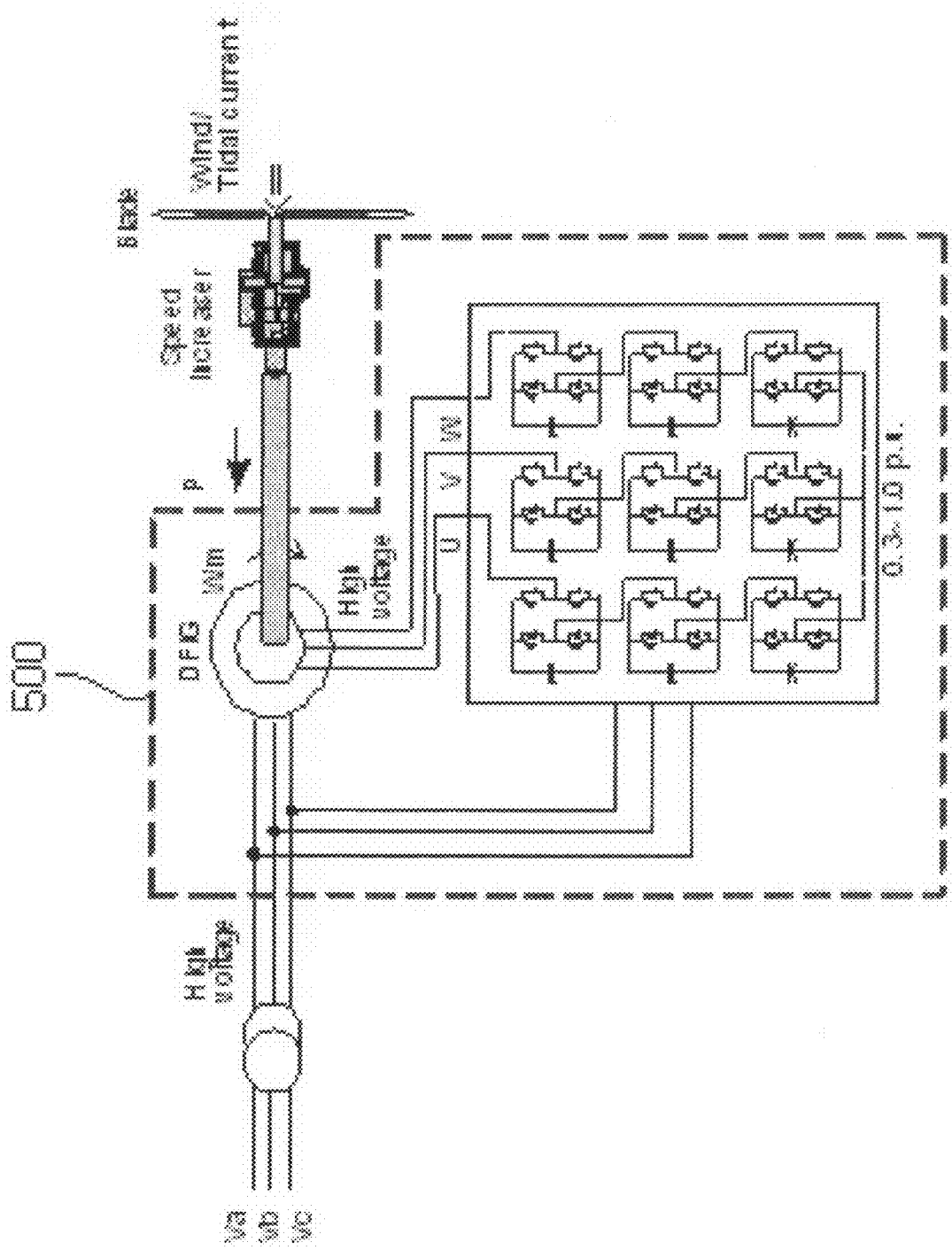
FIG. 24 is a diagram illustrating that a controller of a grid coupled type high voltage doubly-fed induction generator can be employed to put a large-scale wind power generation system, a large-scale tidal current power generation system, a large-scale tidal power generation system, and a large-scale wave power generation system into commercial use.

FIG. 24 is a diagram illustrating that the controller of the doubly-fed induction generator can be utilized to make commercially available a large-scale wind power generation system, a large-scale tidal current power generation system, a large-scale tidal power generation system, and a large-scale wave power generation system.

Referring to FIG. 24, when the controller of the doubly-fed induction generator according to the present invention is employed, it can be seen that the controller can control a wind power generation system having the high voltage and large-scale doubly-fed induction generator (or a tidal current power generation system, a tidal power generation system, a wave power generation system).

What is claimed is:

1. A controller for controlling a doubly-fed induction generator having a stator coil coupled to a three-phase grid coil through a switch and a rotor coil as a control coil, comprising:
   a H-bridge multi-level converter having a multi-level topology that single-phase converters each composed of a 2-leg insulated-gate bipolar transistor (IGBT) are stacked in a serial manner, generating a three-phase voltage waveform, and controlling a rotor current so as to allow a rotor coil of the doubly-fed induction generator to be in charge of a slip power only; and
   a boost converter composed of a 3-leg IGBT and a boost inductor generating a direct current voltage of its source required for the H-bridge multi-level converter.

2. The controller according to claim 1, wherein the H-bridge multi-level converter performs a function of controlling a variable power factor in accordance with a magnitude of a grid voltage, and a function of synchronizing a voltage generated in the stator coil with a grid voltage without causing an inrush current.

3. The controller according to claim 2, wherein when the power factor of the stator coil is controlled for division by the H-bridge multi-level converter, an active power reference value determined by an existing maximum power point tracking method is set to a different and apparent power parameter ($S_*$), which is completely converted to an active power reference value by making one a power factor reference value when the grid voltage is in a stable range, however, when the grid voltage becomes unstable, the power factor reference value is set to be lower using an equation $\eta^*=1-|slop^*|\times\Delta e$ in accordance with a degree of the unstableness so that a rate of converting into an active power is determined to be lower using an equation $p_s^*=\eta^*\times S^*$, and the rest is made to have a reactive power reference value using an equation $$Q_s^* = P_s^* \times \sqrt{\frac{1}{(\eta^*)^2} - 1}$$

so as to restore the grid voltage.

4. The controller according to claim 2, wherein when the synchronization is performed by the H-bridge multi-level converter, in order to allow the rotor coil to be in charge of the slip power only, a slip angle ($\theta_{slip}$) is used as a coordinate transformation angle and is calculated using an equation $\theta_{slip}=\theta_s-\theta_r+\theta_{offset}$ when a grid voltage phase angle is $\theta_s$, a rotating position of the generator is $\theta_r$, and a synchronization compensation angle is $\theta_{offset}$.

5. The controller according to claim 2, wherein when the synchronization is performed by the H-bridge multi-level converter, in order to make a phase of a voltage induced toward the stator coil equal to a phase of the grid voltage, a PI controller is used which receives a d-axis voltage error as an input when the d-axis voltage error measured from the stator coil of the generator and the grid coil is $\Delta V_{ds}$, and an output signal of the PI controller is defined as a synchronization compensation angle θoffset determined by $\theta_{offset}=PI(\Delta V_{ds})$.

6. The controller according to claim 2, wherein when the synchronization is performed by the H-bridge multi-level converter, in order to make a magnitude of a voltage induced toward the stator coil equal to a magnitude of the grid voltage, a PI controller is used which receives a q-axis voltage error as an input when the q-axis voltage error measured from the stator coil of the generator and the grid coil is $\Delta V_{qs}$, and an output signal of the PI controller is defined as a d-axis compensation current ($i_{dre\_comp}$) for compensating for the existing d-axis current value, and the d-axis compensation current ($i_{dre\_comp}$) is determined by $i_{dre\_comp} = PI(\Delta V_{qs})$.

7. The controller according to claim 2, wherein when the synchronization is performed by the H-bridge multi-level converter, in order to make a magnitude of a voltage induced toward the stator coil equal to a magnitude of the grid voltage, an additional term, a feed-forward term $i_{dre\_comp\_ff}$ is used to enhance a convergence speed when a d-axis compensation current is calculated so that an equation $i_{dre\_comp} = PI(\Delta V_{qs}) + i_{dre\_comp\_ff}$ is calculated, where E/WeLo can have any value of the feed-forward term $i_{dre\_comp\_ff}$.

8. The controller according to claim 2, wherein when the synchronization is performed by the H-bridge multi-level converter, an error signal ($\Delta i_{dr}$) of the d-axis current controller is calculated from an equation $\Delta i_{dr} = i^{e*}_{dr} - i^{e}_{dr} + i_{dre\_comp}$ using the d-axis compensation current ($i_{dre\_comp}$) required for making a d-axis reference current ($i^{e*}_{dr}$) obtained from a reactive power output equal to a d-axis current ($i^{e}_{dr}$) measured from the stator coil and making a magnitude of a voltage of the stator coil equal to a magnitude of the grid voltage.

9. The controller according to claim 1, wherein the boost converter performs a function of controlling a power factor of the stator coil, a fault ride-through function of controlling a reactive power to be supplied when the grid voltage becomes unstable, and an anti-islanding function of inputting a white noise for easily preventing an islanding.

10. The controller according to claim 9, wherein when the power factor of the stator coil is controlled, a power factor reference value is determined by an equation $\eta^* = 1 - |slop^*| \times \Delta e$ in accordance with a magnitude ($\Delta e$) of the grid voltage varied from a reference value of the grid voltage, where $|slop^*|$ is an attenuation slope and has a predetermined value.

11. The controller according to claim 9, wherein, in order to perform the fault ride-through function, when an output of the boost converter for constantly controlling a direct current_link voltage is set as an apparent current reference value ($i^{e*}_s$), a q-axis current reference value ($i^{e*}_q$) is decreased using an equation $i^{e*}_q = \eta^* \times i^{e*}$ so as to have the fault ride-through function in a short interruption interval in consideration of a power factor ($\eta^*$) of the stator coil variably determined in accordance with a magnitude of the grid voltage variation.

12. The controller according to claim 9, wherein, in order to perform the fault ride-through function by means of the boost converter, a reactive power is supplied in a short interruption interval by supplying a d-axis current component ($i^{e}_{frt}$) calculated from an equation $$i^e_{frt} = k_{frt} \times i^{e*}_q \times \sqrt{\frac{1}{(\eta^*)^2} - 1}$$

using a q-axis current reference value ($i^{e*}_q$) and a power factor reference value ($\eta^*$) to overcome the short interruption.

13. The controller according to claim 9, wherein a d-axis current value ($i^{e}_{frt}$) for having the fault ride-through function is limited to $i^{e}_{frt} = i^{e*}_s$ when $i^{e}_{frt}$ is greater than $i^{e*}_s$ so as to prevent the d-axis current value from exceeding a maximum upper limit.

14. The controller according to claim 9, wherein, in order to perform the anti-islanding function by means of the boost converter, a method of using a sign of a voltage phase angle ($\theta_s$) for obtaining signs periodically alternating between + and −, and a method of using a q-axis rated current ($i_{q\_rated}$) and an adjustment constant ($k_{anti}$) to obtain a d-axis current ($i^{e}_{anti}$) from an equation $i^{e}_{anti} = \text{sign}(\theta_s) \times K_{anti} \times i_{q\_rated}$ for anti-islanding capable of supporting the anti-islanding in an electrical interruption interval, determining that there exists a high possibility of an island mode when a frequency variation width ($\Delta f$) is greater than a predetermined reference value ($\Delta f_{Upper\_Limit}$), increasing a signal currently being input by an increment ($\Delta k_{anti}$) using an equation $k_{anti} = K_{anti} + \Delta K_{anti}$, and inputting within an entire time band a d-axis current ($i^{e}_{anti}$) determined by re-adjusting an adjustment constant ($k_{anti}$) to reduce the current to the initially set d-axis current when the frequency variation width ($\Delta f$) is not greater than a predetermined reference value ($\Delta f_{Lower\_Limit}$), are used to make the frequency variation (df/dt) significantly excited in the electrical interruption interval to rapidly get out of the islanding.

* * * * *